United States Patent [19]

Nogami et al.

[11] Patent Number: 5,093,286
[45] Date of Patent: Mar. 3, 1992

[54] SEMICONDUCTOR-CONTAINING GLASS AND METHOD OF PRODUCING THE SAME

[75] Inventors: Masayuki Nogami, Seto; Shinichi Ogawa, Tokyo, both of Japan

[73] Assignee: Hoya Corporation, Tokyo, Japan

[21] Appl. No.: 626,577

[22] Filed: Mar. 4, 1991

[51] Int. Cl.$^5$ ............ C03C 3/11; C03C 14/00; C03C 8/14
[52] U.S. Cl. .................... 501/17; 501/12; 501/32; 501/40; 501/56
[58] Field of Search ........... 501/4, 40, 12, 56, 17, 501/32; 357/2

[56] References Cited

U.S. PATENT DOCUMENTS

| | | | |
|---|---|---|---|
| 3,241,009 | 3/1966 | Dewald et al. | 501/40 |
| 3,440,068 | 4/1969 | Paterson et al. | 501/40 |
| 3,448,425 | 6/1969 | Shanefield et al. | 501/40 |
| 4,708,942 | 11/1987 | Nishiii et al. | 501/40 |

*Primary Examiner*—Mark L. Bell
*Assistant Examiner*—Alan Wright
*Attorney, Agent, or Firm*—Nixon & Vanderhye

[57] ABSTRACT

The semiconductor-containing glass disclosed herein is a semiconductor-containing glass which is produced by a sol-gel technique and which includes a semiconductor-containing glass characterized in the composition of a glass matrix and a semiconductor-containing glass characterized in the composition of a semiconductor. Either a semiconductor-containing glass has useful properties as a non-linear optical material.

The method of producing semiconductor-containing glass disclosed herein is a method in which oxidization, volatilization or decomposition of a compound semiconductor or volatilization of a constituent element of the compound semiconductor by heat treatment for forming glass from a gel solid can be suppressed when a semiconductor-containing glass in which the compound semiconductor is dispersively precipitated is produced by a sol-gel technique. That is, the method disclosed herein is a method in which a semiconductor-containing glass containing a compound semiconductor dispersively precipitated therein at a high concentration can be produced. The method is characterized in the technique of dispersively precipitating a compound semiconductor.

12 Claims, No Drawings

SEMICONDUCTOR-CONTAINING GLASS AND METHOD OF PRODUCING THE SAME

BACKGROUND OF THE INVENTION

1. Field of the Invention

The present invention relates to a semiconductor-containing glass and the method of producing the same, and in particular, relates to a semiconductor-containing glass produced by making microcrystals of a compound semiconductor be contained in a glass matrix produced by a sol-gel technique, and the method of producing the same. The semiconductor-containing glass according to the present invention is utilized as a glass material having a large non-linear optical effect used in the field of optical information such as light switches, light wavelength converter elements, etc.

2. Prior Art

The semiconductor-containing glass is given attention as a non-linear optical material usable for light switches, light wavelength converter elements, etc. because it has optical bi-stability, a light buffer time of the order of ps (picosecond) a quantum size effect, etc. A multicomponent glass containing about 1% of CdS microcrystals or containing about 1% of $CdS_xSe_{(1-x)}$ microcrystals is generally known as such semiconductor microcrystal-containing glass (hereinafter also called "a semiconductor-containing glass") and available as filter glass. This type semiconductor-containing glass is produced by heating raw materials which will be a glass matrix and a compound semiconductor respectively to prepare a glass melt and then quenching and re-heating the glass.

It can be, however, hardly said that the conventional semiconductor-containing glass produced by such a melting method is useful as a non-linear optical material, from the following points of view. Because volatilization of raw semiconductor materials occurs when a glass melt is prepared, the semiconductor microcrystal concentration in the glass is small. Because the semiconductor microcrystal grows disorderly in the re-heating treatment after quenching, the semiconductor microcrystals are uneven in size. It is difficult to make a thin film. The kinds of the compound semiconductors allowed to be contained in the glass are limited.

Therefore, various attempts to produce a semiconductor-containing glass by using novel techniques of producing amorphous materials (e.g. a sol-gel technique, a CVD technique, sputtering technique, a simultaneous evaporation technique, a lithographic technique, and a method using a porous glass) have been made for the purposes of increase in the semiconductor microcrystal concentration in the glass, uniformization of the size of the semiconductor microcrystal, formation of the glass in the form of a thin film, etc. At the same time, various attempts to produce various semiconductor-containing silica glasses have been made in order to obtain various kinds of semiconductor-containing glasses having the non-linear optical characteristics and various optical characteristics. With the attempts, other semiconductor-containing silica glasses containing microcrystals or fine particles of CuS, CuCl, Au, Si, $Mn_2O_3$, In/GaAs, GaAs, InP, CdSe, ZnSe, CdTe, $CdS_xSe_{(1-x-y)}Te_y$, etc. as a semiconductor than the semiconductor-containing silica glass containing CdS microcrystals or $CdS_xSe_{(1-x)}$ microcrystals has been prepared. Further, attempts have been made to obtain various kinds of semiconductor-containing multicomponent glass.

When producing the semiconductor-containing glass containing compound-semiconductor microcrystals among those various kinds of semiconductor-containing glasses, it is preferable that a sol-gel technique is used. This is because the increase in the compound semiconductor microcrystal concentration is relatively easy; uniformity of the size of the semiconductor microcrystal is relatively high; the degree of freedom in the shape of the finally produced glass is relatively high; the restriction in the kind of the semiconductor allowed to be contained in the glass is loose; and the like. For example, each of the following methods i to vi is known as a method for producing a semiconductor-containing glass containing compound-semiconductor microcrystals, on the basis of the sol-gel technique.

i. A method comprising the steps of: preparing any one of a sol solution in which both a metallic element and a non-metallic element are contained as raw materials for a compound semiconductor, a sol solution in which a compound semiconductor is dissolved, and a sol solution in which a compound to be changed to a semiconductor by reduction is dissolved; preparing a dry gel by gelating the sol solution and then drying it; and producing a semiconductor-containing glass by applying preliminary heat treatment to the dry gel to precipitate compound semiconductor microcrystals before vitrification and then applying heat treatment thereto again or by precipitating compound semiconductor microcrystals by heat treatment for vitrification of the dry gel.

ii. A method comprising the steps of: preparing a sol solution containing one of a metallic element and a non-metallic element as a raw material for a compound semiconductor; preparing a wet gel from the sol solution; impregnating the wet gel with a solution containing the other one of the metallic element and the non-metallic element as a constituent member of the compound semiconductor and then preparing a dry gel; and producing a semiconductor-containing glass by applying preliminary heat treatment to the dry gel to precipitate compound semiconducor microcrystals before vitrification and then applying heat treatment thereto again or by precipitating compound semiconductor microcrystals by heat treatment for vitrification of the dry gel.

iii. A method comprising the steps of: preparing a sol solution containing one of a metallic element and a non-metallic element as a raw material for a compound semiconductor; preparing a dry gel by gelating the sol solution and drying it; impregnating the dry gel with a solution containing the other one of the metallic element and the non-metallic element as a constituent member of the compound semiconductor and then preparing a dry gel; and producing a semiconductor-containing glass by applying preliminary treatment to the dry gel to precipitate compound semiconductor microcrystals before vitrification and then applying heat treatment thereto again or by precipitating compound semiconductor microcrystals by heat treatment for vitrification of the dry gel.

iv. A method comprising the steps of: preparing a wet gel by gelating a sol solution corresponding to the composition of a glass matrix; preparing a dry gel after impregnating the wet gel with any one of a sol solution in which both a metallic element and a non-metallic element are contained as raw materials for a compound semiconductor, a sol solution in which a compound semiconductor is dissolved, and a sol solution in which a compound to be changed to a semiconductor by reduction is dissolved; and producing a semiconductor-containing glass by applying preliminary heat treatment to the dry gel to precipitate compound semiconductor microcrystals before vitrification and then applying heat treatment thereto again or by precipitating compound semiconductor microcrystals by heat treatment for vitrification of the dry gel.

v. A method comprising the steps of: preparing a dry gel by gelating a sol solution corresponding to the composition of a glass matrix; impregnating the dry gel with any one of a sol solution in which both a metallic element and a non-metallic element are contained as raw materials for a compound semiconductor, a sol solution in which a compound semiconductor is dissolved, and a sol solution in which a compound to be changed to a semiconductor by reduction is dissolved; and producing a semiconductor-containing glass by applying preliminary heat treatment to the dry gel to precipitate compound semiconductor microcrystals before vitrification and then applying heat treatment thereto again or by precipitating compound semiconductor microcrystals by heat treatment for vitrification of the dry gel.

vi. A method disclosed in Japanese Patent Unexamined Publication No. Hei-1-183438.

Here, the method disclosed in the Japanese Patent Unexamined Publication No. Hei-1-183438 is a method for doping a dry gel with a compound semiconductor having a small particle size and having a uniform particle size distribution by the following techniques:

(a) Immersing a dry gel (which has been described as "porous glass" in the above Japanese Patent Unexamined Publication but it is apparent that the "porous glass" described therein is equivalent to dry gel considering the heat treatment condition described in the above Japanese Patent Unexamined Publication) in a dispersion of hydrosol or organosol of a compound semiconductor, drying and heating it.

(b) Making a metal element as a raw material for a compound semiconductor be contained in a sol solution to prepare a dry gel, and then making the dry gel react with a hydrogen sulfide gas at a room temperature for a long time.

The present invention has been attained in the existing circumstances of a semiconductor-containing glass.

A first object of the present invention is to provide a novel semiconductor-containing glass having, as a glass matrix, multicomponent glass produced by a sol-gel technique.

A second object of the present invention is to provide a novel semiconductor-containing glass having, as a glass matrix, silica glass produced by a sol-gel technique.

A third object of the present invention is to provide a method for solving the problems in the conventional semiconductor-containing glass producing methods based on a sol-gel technique, that is, to provide a method for solving the problems in the aforementioned conventional methods (i to v) in which a dry gel has (a) both a metal element and a non-metal element as raw compound semiconductor materials or (b) a compound semiconductor contained therein at the stage of dry gel, and in the aforementioned conventional method (vi) in which a dry gel is doped with a compound semiconductor at the stage of the dry gel. As described above, in the conventional methods, the heat treatment of the dry gel is necessary for producing a semiconductor-containing glass having a practically sufficient mechanical strength. Because oxidization or volatilization of the metal element and/or the non-metal element occurs in the heat treatment in the conventional methods, or because oxidization, volatilization or decomposition of the compound semiconductor contained in the dry gel or as a dopant in the dry gel occurs in the heat treatment, the semiconductor allowed to be contained in the finally produced semiconductor-containing glass is severely restricted as to the kind and the quantity thereof. The third object of the present invention is therefore to provide a method of producing a semiconductor-containing glass in which: lowering of the compound semiconductor content caused by the heat treatment for forming glass can be suppressed when a semiconductor-containing glass having compound semiconductor microcrystals dispersively precipitated is produced by a sol-gel technique; the size of the compound semiconductor microcrystals can be controlled when a semiconductor-containing glass having compound semiconductor microcrystals dispersively precipitated is produced by the sol-gel technique; and the method can be applied to various kinds of compound semiconductors.

SUMMARY OF THE INVENTION

The present invention has been made in order to achieve the above objects, and the above first object has been achieved by a semiconductor-containing glass (hereinafter called "semiconductor-containing glass I") comprising: multicomponent glass as a glass matrix, said multicomponent glass being produced by a sol-gel technique and containing $SiO_2$ as a main component and at least one member selected from the group consisting of $ZrO_2$, $TiO_2$, $Al_2O_3$, $Na_2O$, $K_2O$, $Li_2O$, $MgO$, $ZnO$, $CaO$, $PbO$, $BaO$, $B_2O_3$, $P_2O_5$, $SrO$ and $La_2O_3$ as a subsidiary component; and at least one compound semiconductor selected from the group consisting of CdS, PbS, ZnS, CdSe, ZnSe, PbSe, CdTe, PbTe, ZnTe and CuCl, said compound semiconductor being dispersively crystallized in an amount of not smaller than 0.1% by weight, in the glass matrix.

The above second object has been achieved by a semiconductor-containing glass (hereinafter called "semiconductor-containing glass II") comprising: silica glass as a glass matrix, said silica glass being produced by a sol-gel technique; and at least one compound semiconductor selected from the group consisting of PbS, ZnSe, PbSe, PbTe, ZnTe, CuBr and CuI, said compound semiconductor dispersively crystallized in an amount of not smaller than 0.1% by weight, in the glass matrix.

Further, the above third object has been achieved by a method of producing a semiconductor-containing glass (hereinafter called "producing method A") comprising: a first step of preparing a gel solid which contains at least one metal element as a raw material for a compound semiconductor and which will later form a glass by heat treatment; and a second step of exposing the gel solid to a gas after heating the gel solid to a temperature of from 400° to 1150° C. to form a glass or while heating the gel solid to a temperature of from 400° to 1150° C. to form a glass, the gas containing at least one non-metal element which reacts with the metal element to thereby produce a compound semiconductor.

DETAILED DESCRIPTION OF THE INVENTION

The present invention will be described in detail hereinbelow.

First, the semiconductor-containing glass I will be described. As described above, the glass matrix of the semiconductor-containing glass I is formed of multi-component glass containing $SiO_2$ as a main component and produced by a sol-gel technique. The proportion of respective components in the glass matrix is not limited specially except that the glass matrix must contain $SiO_2$ as a main component. Any optimum composition for the glass matrix can be selected according to the use of the semiconductor-containing glass and according to the characteristics, such as reflectivity, refractive index, thermal expansivity, weather resistance, etc., required for the semiconductor-containing glass. Here, the main component of the glass matrix means a component which ranks first in the composition of the glass matrix as regards the proportion of the component (calculated by mol %).

In the semiconductor-containing glass I, the compound semiconductor microcrystals are dispersively crystallized in an amount of not smaller than 0.1% by weight, in the glass matrix. If the amount of the compound semiconductor to the glass matrix is smaller than 0.1% by weight, it is impossible to produce a semiconductor-containing glass excellent in non-linear optical characteristic. Accordingly, it is preferable that the amount of the compound semiconductor is not smaller than 0.1% by weight. The particle diameter of the compound semiconductor microcrystal is not limited specifically. However, if the particle diameter is larger than 1000 Å, the resulting glass is unsuitable for an optical material because disadvantages such as lowering of light permeability caused by the scattering of light, remarkable lowering of the quantum size effect, etc. Accordingly, the particle diameter of the compound semiconductor microcrystals is, preferably, not larger than 1000 Å, and more preferably, not larger than 100 Å.

To produce such a semiconductor-containing glass I, metal alkoxides corresponding to oxides as constituent members of a glass matrix are used as raw-material alkoxides for the glass matrix. That is, a metal alkoxide corresponding to $SiO_2$ (in this specification, an Si alkoxide is also regarded as a metal alkoxide) and at least one metal alkoxide selected from the group consisting of metal alkoxides corresponding to $ZrO_2$, $TiO_2$, $Al_2O_3$, $Na_2O$, $K_2O$, $Li_2O$, $MgO$, $ZnO$, $CaO$, $PbO$, $BaO$, $B_2O_3$, $P_2O_5$, $SrO$ and $La_2O_3$ and/or at least one derivative thereof (such as for example methyltriethoxysilane, 3-aminopropyltriethoxysilane, trifluoropropyltrimethoxysilane, etc.) are used as raw materials for the glass matrix. If necessary, other metals, metal oxides, metal halides, metal-inorganic acid salts (nitrates, phosphates, etc.), metal-organic acid salts (acetates, oxalates, etc.), organometallic compounds (alkyl metallic compounds, etc.), metallic complexes, etc. may be used as raw materials. On the other hand, materials as will be shown in the following items 1) to 5) are used as raw materials for the compound semiconductor. Here, the items 4) and 5) may be used in combination with the item 3). The item 5) may be used in combination with the item 2).

1) An element forming a compound semiconductor to be dispersively crystallized in the semiconductor-containing glass I, such as CuBr, CuI, etc, or a solution of the element.

2) A compound semiconductor itself to be dispersively crystallized in the semiconductor-containing glass I, such as $CuBr_2$, $CuI_2$, $CdSO_4$, $CdSeO_4$, $CdTeO_4$, etc, or a solution of the compound.

3) A metal element, a metal oxide, a metal halide, an inorganic acid salt (nitrate, phosphate, etc.), an organic acid salt (acetate, oxalate, etc.), an organometallic compound (metal alkoxide, alkyl metallic compound, etc.), a metallic complex (chelating compound, etc.), etc. each of which contains the metal element as a raw material for the compound semiconductor to be dispersively crystallized in the semiconductor-containing glass I; or an aqueous solution thereof, an organic solvent solution thereof or an inorganic solvent solution thereof.

4) A non metal element itself as a raw material for the compound semiconductor to be dispersively crystallized in the semiconductor-containing glass I, a non metal element-containing inorganic compound for reacting with a metal to form a compound semiconductor, a non metal-element containing organic compound for reacting with a metal to form a compound semiconductor, etc., an aqueous solution thereof, an organic solvent solution thereof or an inorganic solvent solution thereof.

5) A gas containing a non-metallic element as a raw material for the compound semiconductor to be dispersively crystallized in the semiconductor-containing glass I, such as $H_2S$, HCl, $H_2Se$, $H_2Te$, $AsH_3$, $SbH_3$, etc.

Using these raw materials selectively according to the composition of the glass matrix of the semiconductor-containing glass and according to the kind of the compound semiconductor, the semiconductor-containing glass I may be produced by the conventional methods i to vi or may be produced by the producing method A which will be described later in detail.

Next, the semiconductor-containing glass II will be described hereinbelow. As described above, the semiconductor-containing glass II comprises, as a glass matrix, silica glass produced by a sol-gel technique, and at least one compound semiconductor microcrystal selected from the group consisting of PbS, ZnSe, PbSe, PbTe, ZnTe, CuBr and CuI, the compound semiconductor crystal being dispersively crystallized, in an amount of not smaller than 0.1% by weight, in the glass matrix.

Also in the semiconductor-containing glass II, from the same reason as in the semiconductor-containing glass I, it is preferable that the amount of the compound semiconductor to the glass matrix is not smaller than 0.1% by weight. Further, the particle diameter of the compound semiconductor microcrystal is, preferably, not larger than 1000 Å, and more preferably, not larger than 100 Å.

Such a semiconductor-containing glass II can be produced in the same manner as the semiconductor-containing glass I, except that raw materials to be used are restricted because the composition of the glass matrix in the semiconductor-containing glass II is limited to $SiO_2$ and that the kind of the compound semiconductor is restricted to at least one compound semiconductor selected from the aforementioned group.

Next, the producing method A will be described hereinbelow. The producing method A can be used as a method for producing the semiconductor-containing glass I or the semiconductor-containing glass II or can be used as a method for producing known semiconductor-containing glass containing a compound semiconductor.

In the producing method A, a gel solid containing a metallic element as a raw material for a compound semiconductor and to be subjected to heat treatment to form a glass is prepared in the first step. The gel solid to be subjected to heat treatment to form a glass means a dry gel produced in the process of producing a glass by a sol-gel technique.

The metallic element as a raw material for a compound semiconductor (hereinafter also called "compound semiconductor raw material metallic element") contained in the gel solid must react with a gas containing a non-metallic element (which will be described later) to produce a compound semiconductor and must be soluble in water, an organic solvent or an inorganic solvent. Examples of such metallic elements include Cd, Zn, Pb, Cu, Hg, Ag, Ni, Pd, Mn, Co, Ga, Bi, As, In, Al, etc.

The gel solid prepared in the first step must contain at least one metallic element selected from the aforementioned group. Such a gel solid can be prepared by producing a gel solid not containing the aforementioned metallic elements, immersing the gel solid in a solution containing at least one metallic element selected from the aforementioned group, and then drying the gel solid.

The method of producing the gel solid not containing the aforementioned metallic elements is not limited specifically. For example, the gel solid not containing the metallic elements can be produced as follows.

Metal alkoxides corresponding to oxides as constituent members of a glass matrix in the semiconductor-containing glass and/or derivatives thereof are used as raw material alkoxides for the glass matrix. If necessary, other metals, metal oxides, metal halides, metal-inorganic acid salts, metal-organic acid salts, organometallic compounds, metallic complexes are used. These raw materials are mixed corresponding to the composition of the glass matrix of the semiconductor-containing glass, to prepare a sol solution. The sol solution is gelated by hydrolysis to prepare wet gel.

The hydrolysis is conducted by mixing the metal alkoxides and/or derivatives thereof with water and stirring the resulting mixture. In the case where other metal alkoxides and/or derivatives thereof than Si alkoxide and/or its derivatives are used, the Si alkoxide and/or its derivatives which is slow in hydrolysis rate is subjected to hydrolysis, and thereafter the other metal alkoxides and/or derivatives thereof is mixed therewith, and then the whole mixture is subjected to further hydrolysis. The timing for addition of respective raw materials except the metal alkoxides and derivatives thereof is selected according to the characters of the raw materials. That is, the timing for addition of respective raw materials may be before the hydrolysis of the metal alkoxides and/or derivatives thereof, or may be during the hydrolysis or may be after the hydrolysis. The respective raw materials except the metal alkoxides and derivatives thereof may not be added in the form of a solution. That is, any addition method may be used as long as the raw materials can be dissolved in the sol solution before gelation to prepare a uniform sol solution.

The amount of water used for hydrolysis may be about twice as much as the mol amount of the metal alkoxides and/or derivatives thereof, though the amount of water may change according to the kind of the metal alkoxides and derivatives thereof as main raw materials. By using water in the amount larger than the aforementioned value, the time required for hydrolysis can be shortened. Further, by using an acid such as a hydrochloric acid, a nitric acid, an acetic acid, etc. or a base such as $NH_4OH$, pyridine, piperazine, etc. as a catalyst for hydrolysis, the reaction time can be shortened. The amount of the catalyst may be about $1 \times 10^{-3} \sim 1$ time as much as the mol amount of the metal alkoxides and/or derivatives thereof.

Although the hydrolysis proceeds at a room temperature, the reaction time can be shortened by heating to a temperature of about 40° to 200° C. However, at a temperature higher than 80° C., sudden evaporation of a solvent, water and metal alkoxides and/or derivatives thereof occurs undesirably. In this case, the sudden evaporation of solvent, etc. can be prevented by using a cooler to perform refluxing.

After hydrolysis, a slurry-like or solid-like material is prepared. The slurry-like or solid-like material is dried to prepare a gel solid. The time required for drying may be, in general, about 10 hours to about 4 weeks, though the drying time may change according to the factors such as the size of the material to be dried, the shape thereof, the amount of residual water, the temperature used for drying, etc. Thereafter, the temperature is gradually raised to 150° C. to prepare a gel solid containing a smaller amount of residual water. If the heating speed is made high, the gel may be shrinked or contracted suddenly and destroyed. Accordingly, in general, the heating speed is not higher than 10° C. per hour.

A gel solid containing at least one metal element as a raw material for a compound semiconductor and to be subjected to heat treatment to form a glass can be produced by: immersing the gel solid prepared as described above in a solution containing at least one compound semiconductor raw material metallic element; and drying the gel solid.

The solution containing at least one compound semiconductor raw material metallic element, used herein, is prepared by dissolving in water, an organic solvent or an inorganic solvent, at least one member selected from the group of:

(A) metal-organic acid salts (such as a cadmium acetate dihydrous salt, a lead acetate trihydrous salt, a zinc acetate dihydrous salt, a cadmium formate dihydrous salt, a zinc oxalate dihydrous salt, a copper acetate monohydrous salt, a bismuth naphthenate, a lead octylate, etc.);

(B) metal-inorganic acid salts (such as a cadmium nitrate tetrahydrous salt, a copper nitrate trihydrous salt, a manganese nitrate hexahydrous salt, a zinc nitrate hexahydrous salt, a zinc sulfate septahydrous salt, a lead nitrate, a cadmium sulfate, a zinc sulfate, a lead sulfate, a cadmium selenate, a zinc selenate, a lead selenate, a cadmium tellurate, a zinc tellurate, etc.);

(C) metal halides (such as a cadmium iodide, a cadmium chloride, a manganese chloride tetrahydrous salt, a copper bromide, a copper(II) chloride dihydrous salt, etc.);

(D) metallic complexes [such as a zinc acetylacetonato, a tris(ethylenediamine)cadmium nitrate, a tris(2-2'-bipyridine)nickel(II) chloride, etc.];

(E) metal alkoxides (such as a zinc ethoxide, a copper propoxide, a gallium ethoxide, a bismuth ethoxide, etc.);

(F) metals (such as cadmium, zinc, lead, copper, mercury, silver, nickel, palladium, manganese, cobalt, gallium, bismuth, arsenic, indium, aluminum, etc.);

(G) metal oxides (such as a cadmium oxide, a copper oxide, a zinc oxide, a bismuth oxide, a lead oxide, etc.); and the like.

The gel solid prepared in the first step in the producing method A can be also produced by the following methods (a) and (b) other than the aforementioned method.

(a) A solution containing at least one compound semiconductor raw material metallic element is added to a sol solution corresponding to the composition of the glass matrix or the sol solution which is being hydrolyzed, to prepare wet gel containing a metallic element as a raw material for a compound semiconductor. Then, the wet gel is dried to prepare a gel solid. Although description has been made about the case where the compound semiconductor raw material metallic element is added in the form of a solution containing the metallic element, the metal element may be added directly in the form of an organic acid salt, an inorganic acid salt, a halide, a complex, a metal alkoxide, a metal oxide or a metal as long as it can be uniformly dissolved in the sol solution before gelation.

(b) A sol solution corresponding to the composition of the glass matrix is gelated to prepare wet gel. The wet gel is impregnated with a solution prepared by dissolving a compound semiconductor raw material metallic element therein and then dried to prepare a gel solid.

For production of glass containing a compound semiconductor composed of one metallic element and two non-metallic elements, such as $CdS_xSe_{(1-x)}$ or $CdS_xTe_{(1-x)}$, it is preferable that one metallic element and one non-metallic element have been previously contained in the gel solid. In this case, one metallic element can be previously contained in the gel solid by using an organic acid salt, an inorganic acid salt, a halide, a complex, a metal alkoxide, a metal oxide or a metal containing the metallic element or using a solution thereof. Also, one non-metallic element can be previously contained in the gel solid in the same manner as the metallic element, by using the non-metal element itself or a solution thereof. As another method, a chalcogen element-containing compound such as $CdSO_4$, $CdSeO_4$, $CdTeO_4$, $ZnSO_4$, $ZnSeO_4$, $ZnTeO_4$, $PbSO_4$, $PbSeO_4$, etc. or a solution thereof may be used to contain one metallic element and one non-metallic element in the gel solid.

In the producing method A, the second step is carried out which comprises exposing the gel solid prepared as described above to a gas containing a non-metallic element which reacts with the compound semiconductor raw material metallic element to thereby produce a compound semiconductor after vitrifying the gel solid by heating to a temperature of 400° to 1150° C. or while vitrifying the gel solid by heating to a temperature of 400° to 1150° C.

If the gel solid is vitrified by heating at a temperature lower than 400° C., water and organic matters remain so that the gel solid cannot be vitrified sufficiently. That is, "vitrification of the gel solid" in this specification means that water and organic matters contained in the gel solid are substantially perfectly removed. If the gel solid is vitrified by heating at a temperature higher than 1150° C., the size of pores in the gel solid becomes so small that the compound semiconductor raw material metallic element can hardly react with the non-metallic element-containing gas.

In the case where the vitrified material is exposed to the non-metallic element-containing gas after vitrifying the gel solid, the atmosphere in the vitrification is not limited specifically. Any suitable atmosphere, for example, an air atmosphere, an oxidizing atmosphere, an inert gas atmosphere or a reducing atmosphere, can be used in the vitrification.

Examples of the non-metallic element-containing gas used in the second step include $H_2S$, $HCl$, $H_2Se$, $H_2Te$, $AsH_3$, $SbH_3$, etc. These gases can be suitably selected according to the kind of the compound semiconductor raw material metallic element contained in the gel solid, the kind of the compound semiconductor to be contained in the semiconductor-containing glass, etc.

The exposure of the gel solid or vitrified material to the gas can be made easily by making the gel solid or vitrified material stand in an atmosphere of the gas.

By the exposure treatment, glass containing a compound semiconductor microcrystal can be produced. In the case where the exposure treatment is applied after the vitrification of the gel solid, the size of the compound semiconductor microcrystal depends on the atmosphere, the treatment temperature and the treatment time in the vitrification and the treatment temperature, the treatment time and the gas partial pressure in the exposure to the non-metallic element-containing gas. In the case where the exposure treatment is applied while the gel solid is vitrified, the size of the compound semiconductor microcrystal depends on the treatment temperature and the treatment time in the vitrification and the partial pressure of the non-metallic element-containing gas.

Accordingly, in the second step, the size of the compound semiconductor microcrystal can be controlled by selecting suitably the treatment condition for vitrification of the gel solid and/or the treatment condition for exposure of the gel solid to the non-metallic element-containing gas. Although the treatment condition can be suitably selected as described above, the size of the compound semiconductor microcrystal is, preferably, not larger than 1000 Å, and more preferably, not larger than 100 Å. This is because scattering of light in the semiconductor-containing glass having compound semiconductor crystals of the size larger than 1000 Å dispersively crystallized is so intensive that light transmittance is lowered or the quantum size effect is lowered remarkably.

In the producing method A including the first step and the second step, not only the size of the compound semiconductor microcrystal can be controlled easily to be a desired value but a semiconductor-containing glass uniform in the size of the compound semiconductor microcrystal can be produced. Because the compound semiconductor microcrystal is dispersively crystallized on the basis of a sol-gel technique after vitrifying the gel solid or while vitrifying the gel solid, not only the compound semiconductor microcrystal concentration can be increased easily but the kind of compound semiconductors allowed to be contained in the glass can be selected widely.

Because the shape of the semiconductor-containing glass thus produced greatly depends on the shape of the vessel in gelation of the sol solution, any suitable shape of the semiconductor-containing glass can be attained by suitably selecting the shape of the vessel in gelation of the sol solution. Further, thin-film-shaped semiconductor-containing glass can be produced by carrying out gelation and vitrification after applying the sol solution onto the substrate. Alternatively, thick-film-shaped semiconductor-containing glass can be produced by repeating the application of the sol solution onto the substrate, the gelation and the vitrification by a predetermined number of times.

Examples according to the present invention will be described hereinbelow.

EXAMPLE 1

CdS microcrystal-containing multicomponent glass according to the producing method A Into a solution of 27.5 g of 0.15 mol/l hydrochloric acid (HCl) aqueous solution and 394.7 g of ethanol ($C_2H_5OH$), 325.3 g of tetraethoxysilane [$Si(OC_2H_5)_4$] was added dropwise while stirring. After all of Si-($OC_2H_5$)$_4$ was added, the mixture solution was further stirred for an hour to prepare a partially hydrolyzed solution. Into the partially hydrolyzed solution, 35.8 g of aluminum butoxide [$Al(OC_4H_9)_3$] was added and then the resulting mixture solution was heated and refluxed for 24 hours in a nitrogen atmosphere. Separately, 9.41 g of cadmium acetate dihydrous salt [$Cd(CH_3COO)_2.2H_2O$] was dissolved into 60 g of methanol ($CH_3OH$) to prepare a solution. The solution was put into the refluxed sol solution and stirred for an hour. After stirring, 77.8 g of $C_2H_5OH$ and 121.7 g of 0.15 mol/l $NH_4OH$ aqueous solution were added thereto and further stirred for an hour. Then, the resulting sol solution was poured into a vessel made of a material such as polymethylpentene, polypropylene, etc. and was allowed to stand. The hydrolysis of the sol solution progressed further, whereby it is gelated to form a wet gel. Then, the wet gel was carefully dried to volatilize unnecessary water and alcohol to thereby prepare a gel solid (dry gel) containing Cd element.

The gel solid was heated at 500° C. for 2 hours to form a glass. Then, the glass was allowed to stand at a room temperature in the presence of $H_2S$ gas at 1 atmospheric pressure for 1 hour to thereby prepare a semiconductor-containing glass (CdS microcrystal-containing multicomponent glass).

The glass matrix of the semiconductor-containing glass was composed of $5Al_2O_3.95SiO_2$ (it means that the glass contains 5 mol % of $Al_2O_3$ and 95 mol % of $SiO_2$) and contained 5% by weight of CdS.

In the semiconductor-containing glass, only CdS crystal was recognized by X-ray diffraction measurement. The existence of other crystals was not observed. The particle diameter of the CdS crystals calculated on the basis of the (110) peak width of the CdS crystals using the Scherrer's formula $$D = K\lambda/\beta\cos\theta$$

(D: particle diameter, K: constant, $\lambda$: X-ray wavelength, $\beta$: peak width, $\theta$: diffraction angle) was about 40 Å. The energy gap value calculated on the basis of the absorption end of the light absorption spectra of the glass was 2.7 eV. It was apparent that the effect of large quantum size was attained.

The composition of the thus prepared semiconductor-containing glass, the condition (temperature and time) for forming glass from the gel solid, the condition (temperature and time) for $H_2S$ gas treatment, the energy gap value and the particle diameter of the semiconductor microcrystals were tabulated as Table 1.

EXAMPLES 2 and 3

CdS microcrystal-containing multicomponent glass according to the producing method A Various semiconductor-containing glasses (CdS microcrystal-containing multicomponent glasses) having physical properties as shown in Table 1 were prepared in the glass-forming condition and the gas treatment condition as shown in Table 1 and in the same manner as in Example 1, except that $Cd(CH_3COO)_2.2H_2O$ was respectively replaced by cadmium iodide ($CdI_2$) (Example 2) and cadmium nitrate tetrahydrous salt [$Cd(NO_3)_2.4H_2O$] (Example 3).

EXAMPLE 4

CdS microcrystal-containing multicomponent glass according to the producing method A After preparing 414.0 g of partially hydrolyzed Si-($OC_2H_5$)$_4$ solution in the same manner as in Example 1, a gel solid was prepared in the nearly same manner as in Example 1, except that $Al(OC_4H_9)_3$ used in Example 1 was replaced by a solution prepared by dissolving 13.9 g of sodium acetate ($CH_3COONa$) into a mixture solution of 53.8 g of $C_2H_5OH$ and 34.4 g of 0.15 mol/l $NH_4OH$ aqueous solution and that heating/refluxing treatment in a nitrogen atmosphere was omitted. Then, a semiconductor-containing glass (CdS microcrystal-containing glass) having physical properties as shown in Table 1 was prepared in the same manner as in Example 1 and in the glass-forming condition and the gas treatment condition as shown in Table 1.

EXAMPLE 5

CdS microcrystal-containing multicomponent glass according to the producing method A After preparing 431.1 g of partially hydrolyzed Si-($OC_2H_5$)$_4$ solution in the same manner as in Example 1, a gel solid was prepared in the nearly same manner as in Example 1, except that $Al(OC_4H_9)_3$ used in Example 1 was replaced by a solution prepared by dissolving 12.5 g of zinc nitrate hexahydrous salt [$Zn(NO_3)_2.6H_2O$] into 50 g of acetylacetone ($CH_3COCH_2COCH_3$) and that heating/refluxing treatment in a nitrogen atmosphere was omitted. Then, a semiconductor-containing glass (CdS microcrystal-containing glass) having physical properties as shown in Table 1 was prepared in the same manner as in Example 1 and in the glass-forming condition and the gas treatment condition as shown in Table 1.

EXAMPLE 6

CdS microcrystal-containing multicomponent glass according to the producing method A After preparing 305.1 g of partially hydrolyzed Si-($OC_2H_5$)$_4$ solution in the same manner as in Example 1, a gel solid was prepared in the nearly same manner as in Example 1, except that $Al(OC_4H_9)_3$ used in Example 1 was replaced by 118.4 g of zirconium propoxide [$Zr(OC_3H_7)_4$] and that heating/refluxing treatment in a nitrogen atmosphere was omitted. Then, a semiconductor-containing glass (CdS microcrystal-containing glass) having physical properties as shown in Table 1 was prepared in the same manner as in Example 1 and in the glass-forming condition and the gas treatment condition as shown in Table 1.

EXAMPLES 7 to 16

CdS microcrystal-containing multicomponent glass according to the producing method A After preparing 345.7 g of partially hydrolyzed Si-$(OC_2H_5)_4$ solution in the same manner as in Example 1, gel solids were prepared in the nearly same manner as in Example 1, except that $Al(OC_4H_9)_3$ used in Example 1 was replaced by 53.3 g of titanium butoxide [Ti-$(OC_4H_9)_4$]; that heating/refluxing treatment in a nitrogen atmosphere was omitted; and that the $Cd(CH_3COO)_2.2H_2O$ content in the partially hydrolyzed solution was changed variously. Then, various pieces of semiconductor-containing glasses (CdS microcrystal-containing glasses) having physical properties as shown in Table 1 were respectively prepared in the same manner as in Example 1 and in the glass-forming condition and the gas treatment condition as shown in Table 1.

EXAMPLE 17

CdS microcrystal-containing multicomponent glass according to the producing method A After preparing 611.8 g of partially hydrolyzed Si-$(OC_2H_5)_4$ solution in the same manner as in Example 1, a gel solid containing Cd element was prepared in the nearly same manner as in Example 1, except that Al-$(OC_4H_9)_3$ used in Example 1 was replaced by 35.8 g of $Al(OC_4H_9)_3$ and 29.0 g of methanol solution of 28% sodium methoxide ($CH_3ONa$). Here, the methanol solution of 28% $CH_3ONa$ was added to a solution prepared by adding $Al(OC_4H_9)_3$ into the partially hydrolyzed Si$(OC_2H_5)_4$ solution, heating/refluxing the mixture solution in a nitrogen atmosphere for 24 hours and cooling it to room temperature. After the addition of the methanol solution, the resulting mixture solution was stirred for an hour.

Thereafter, a semiconductor-containing glass (CdS microcrystal-containing glass) having physical properties as shown in Table 1 was prepared in the same manner as in Example 1 and in the glass-forming condition and the gas treatment condition as shown in Table 1.

EXAMPLE 18

CdS microcrystal-containing multicomponent glass according to the producing method A After preparing 387.2 g of partially hydrolyzed Si-$(OC_2H_5)_4$ solution in the same manner as in Example 1, a gel solid containing Cd element was prepared in the nearly same manner as in Example 1, except that Al-$(OC_4H_9)_3$ used in Example 1 was replaced by 14.8 g of $Al(OC_4H_9)_3$ and 21.2 g of aqueous solution of 85% phosphoric acid ($H_3PO_4$). Here, $Al(OC_4H_9)_3$ and aqueous solution of 85% phosphoric acid ($H_3PO_4$) were successively added into the partially hydrolyzed solution and then stirred for an hour without heating/refluxing treatment in a nitrogen atmosphere.

Thereafter, a semiconductor-containing glass (CdS microcrystal-containing glass) having physical properties as shown in Table 1 was prepared in the same manner as in Example 1 and in the glass-forming condition and the gas treatment condition as shown in Table 1.

EXAMPLE 19

CdS microcrystal-containing multicomponent glass according to the producing method A After preparing 410.9 g of partially hydrolyzed Si-$(OC_2H_5)_4$ solution in the same manner as in Example 1, a gel solid containing Cd element was prepared in the nearly same manner as in Example 1, except that Al-$(OC_4H_9)_3$ used in Example 1 was replaced by a mixture of a solution prepared by dissolving 10.2 g of boracic acid ($H_3BO_3$) into 140 g of $C_2H_5OH$ and 31.8 g of methanol solution of 28% $CH_3ONa$. Here, the methanol solution of 28% $CH_3ONa$ was added under ice cooling to a solution prepared by: adding the aforementioned $H_3BO_3$ solution into the partially hydrolyzed Si-$(OC_2H_5)_4$; stirring them for an hour; and cooling them with ice to a suitable temperature. After the addition of the methanol solution, the resulting mixture solution was stirred for an hour.

Thereafter, a semiconductor-containing glass (CdS microcrystal-containing glass) having physical properties as shown in Table 1 was prepared in the same manner as in Example 1 and in the glass-forming condition and the gas treatment condition as shown in Table 1.

EXAMPLE 20

CdS microcrystal-containing multicomponent glass according to the producing method A After preparing 285.2 g of partially hydrolyzed Si-$(OC_2H_5)_4$ solution in the same manner as in Example 1, a gel solid containing Cd element was prepared in the nearly same manner as in Example 1, except that Al-$(OC_4H_9)_3$ used in Example 1 was replaced by 119.6 g of $Zr(OC_3H_7)_4$ and 26.4 g of methanol solution of 28% $CH_3ONa$. Here, $Zr(OC_3H_7)_4$ and methanol solution of 28% $CH_3ONa$ were successively added into the partially hydrolyzed solution and then stirred for an hour without heating/refluxing treatment in a nitrogen atmosphere.

Thereafter, a semiconductor-containing glass (CdS microcrystal-containing glass) having physical properties as shown in Table 1 was prepared in the same manner as in Example 1 and in the glass-forming condition and the gas treatment condition as shown in Table 1.

TABLE 1

| Example | Semiconductor-containing glass | | | | Energy gap value (eV) | Particle diameter (Å) |
| | Semiconductor (wt %) | Glass matrix | Glass-forming condition | Gas treatment condition* | | |
| --- | --- | --- | --- | --- | --- | --- |
| 1 | CdS (5 wt %) | $5Al_2O_3.95SiO_2$ | 500° C. × 2 hours | Room temperature × 1 hour | 2.7 | 40 |
| 2 | CdS (5 wt %) | $5Al_2O_3.95SiO_2$ | 500° C. × 2 hours | Room temperature × 1 hour | 2.68 | 35 |
| 3 | CdS (5 wt %) | $5Al_2O_3.95SiO_2$ | 500° C. × 2 hours | Room temperature × 1 hour | 2.71 | 33 |
| 4 | CdS (5 wt %) | $10Na_2O.90SiO_2$ | 500° C. × 2 hours | Room temperature × 1 hour | 2.6 | 40 |
| 5 | CdS (1.9 wt %) | $4.8ZnO.95.2SiO_2$ | 500° C. × 2 hours | Room temperature × 1 hour | 2.75 | 30 |

TABLE 1-continued

| | Semiconductor-containing glass | | | | Energy gap value (eV) | Particle diameter (Å) |
|---|---|---|---|---|---|---|
| Example | Semiconductor (wt %) | Glass matrix | Glass-forming condition | Gas treatment condition* | | |
| 6 | CdS (5 wt %) | $20ZrO_2.80SiO_2$ | 500° C. × 2 hours | Room temperature × 1 hour | 2.6 | 40 |
| 7 | CdS (5 wt %) | $20TiO_2.80SiO_2$ | 500° C. × 2 hours | Room temperature × 1 hour | 2.50 | 40 |
| 8 | CdS (5 wt %) | $20TiO_2.80SiO_2$ | 700° C. × 2 hours | Room temperature × 1 hour | 2.67 | 35 |
| 9 | CdS (5 wt %) | $20TiO_2.80SiO_2$ | 700° C. × 2 hours | 250° C. × 1 hour | 2.52 | 48 |
| 10 | CdS (2 wt %) | $20TiO_2.80SiO_2$ | 500° C. × 2 hours | Room temperature × 1 hour | 2.70 | 34 |
| 11 | CdS (2 wt %) | $20TiO_2.80SiO_2$ | 700° C. × 2 hours | Room temperature × 1 hour | 2.88 | 28 |
| 12 | CdS (2 wt %) | $20TiO_2.80SiO_2$ | 700° C. × 2 hours | 250° C. × 1 hour | 2.68 | 35 |
| 13 | CdS (10 wt %) | $20TiO_2.80SiO_2$ | 500° C. × 2 hours | Room temperature × 1 hour | 2.42 | 73 |
| 14 | CdS (10 wt %) | $20TiO_2.80SiO_2$ | 700° C. × 2 hours | Room temperature × 1 hour | 2.58 | 42 |
| 15 | CdS (10 wt %) | $20TiO_2.80SiO_2$ | 700° C. × 2 hours | 250° C. × 1 hour | 2.45 | 62 |
| 16 | CdS (15 wt %) | $20TiO_2.80SiO_2$ | 700° C. × 2 hours | Room temperature × 1 hour | 2.50 | 51 |
| 17 | CdS (5 wt %) | $5Na_2O.20Al_2O_3.75SiO_2$ | 500° C. × 2 hours | Room temperature × 1 hour | 2.6 | 40 |
| 18 | CdS (5 wt %) | $6P_2O_5.2Al_2O_3.92SiO_2$ | 500° C. × 2 hours | Room temperature × 1 hour | 2.7 | 30 |
| 19 | CdS (5 wt %) | $5Na_2O.5B_2O_3.90SiO_2$ | 500° C. × 2 hours | Room temperature × 1 hour | 2.7 | 30 |
| 20 | CdS (5 wt %) | $5Na_2O.20ZrO_2.75SiO_2$ | 500° C. × 2 hours | Room temperature × 1 hour | 2.6 | 40 |

*$H_2S$ gas at 1 atmospheric pressure was used as a gas.

EXAMPLES 21 to 48

CdS microcrystal-containing multicomponent glasses according to the producing method A Raw materials used in the sol-gel method, such as metal alkoxides corresponding to $SiO_2$, $ZrO_2$, $TiO_2$, $Al_2O_3$, $Na_2O$, $K_2O$, $Li_2O$, MgO, ZnO, CaO, BaO, $B_2O_3$, $P_2O_5$, SrO and $La_2O_3$ and/or derivatives thereof were used as raw materials for glass matrices. Cadmium acetate was used as a raw material for compound semiconductor. Gel solids containing Cd element were prepared using the aforementioned raw materials.

Then, the gel solids thus prepared were heated in a temperature range of 400° to 1150° C. to form a glass. After glass was formed or while glass was formed, the glass and the gel solids were exposed to $H_2S$ gas to prepare various semiconductor-containing glasses (CdS microcrystal-containing multicomponent glasses) having physical properties as shown in Table 2.

EXAMPLE 49

CdS microcrystal-containing multicomponent glass according to the producing method A A sol solution was prepared using raw materials used in the sol-gel method, such as metal alkoxides corresponding to $SiO_2$ and $TiO_2$ and/or derivatives thereof, as raw materials for a glass matrix. The sol solution was gelated to form a wet gel. The wet gel was impregnated with a solution prepared by dissolving cadmium acetate therein to thereby prepare dry gel (gel solid).

Then, the dry gel was heated in a temperature range of 400° to 1150° C. to form a glass. After the glass was formed, the glass was exposed to $H_2S$ gas to dispersively crystallized CdS microcrystals to thereby prepare a semiconductor-containing glass (CdS microcrystal-containing multicomponent glass) having physical properties as shown in Table 2.

EXAMPLE 50

CdS microcrystal-containing multicomponent glass according to the conventional method Raw materials used in the sol-gel method, such as metal alkoxides corresponding to $SiO_2$, $Al_2O_3$ and $TiO_2$ and/or derivatives thereof were used as raw materials for a glass matrix. Cadmium acetate and $NH_4SO_4$ were used as raw materials for compound semiconductor. A sol solution containing Cd element and S element was prepared using the aforementioned raw materials. Dry gel (gel solid) was prepared from the sol solution and then treated in a temperature range of 400° to 1300° C. in an atmosphere of inert gas to react elements Cd and S to thereby dispersively crystallize Cds microcrystals and form a glass to thereby prepare a semiconductor-containing glass (CdS microcrystal-containing multicomponent glass) having physical properties as shown in Table 2.

EXAMPLE 51

CdS microcrystal-containing multicomponent glass according to the conventional method A sol solution was prepared using raw materials used in the sol-gel method, such as metal alkoxides corresponding to $SiO_2$ and $ZrO_2$ and/or derivatives thereof, as raw materials for a glass matrix. The sol solution was gelated to form a wet gel. The wet gel was impregnated with a solution prepared by dissolving $CdSO_4$ therein to thereby prepare dry gel (gel solid).

Then, the dry gel was treated in a temperature range of 400° to 1300° C. in a reducing atmosphere to dispersively precipitate CdS microcrystals and form a glass to thereby prepare a semiconductor-containing glass (CdS microcrystal-containing multicomponent glass) having physical properties as shown in Table 2.

TABLE 2

| Example | Semiconductor-containing glass Semiconductor (wt %) | Glass matrix | Energy gap value (eV) | Particle diameter (Å) |
|---|---|---|---|---|
| 21 | CdS (1.9 wt %) | $4.8ZnO.95.2SiO_2$ | 2.75 | 30 |
| 22 | CdS (2 wt %) | $20TiO_2.80SiO_2$ | 2.7 | 34 |
| 23 | CdS (5 wt %) | $20TiO_2.80SiO_2$ | 2.6 | 40 |
| 24 | CdS (5 wt %) | $5Al_2O_3.95SiO_2$ | 2.7 | 35 |
| 25 | CdS (5 wt %) | $5Al_2O_3.95SiO_2$ | 2.68 | 33 |
| 26 | CdS (5 wt %) | $5Al_2O_3.95SiO_2$ | 2.71 | 40 |
| 27 | CdS (5 wt %) | $10Na_2O.90SiO_2$ | 2.6 | 40 |
| 28 | CdS (5 wt %) | $20ZrO_2.80SiO_2$ | 2.6 | 40 |
| 29 | CdS (5 wt %) | $10Li_2O.90SiO_2$ | 2.59 | 41 |
| 30 | CdS (5 wt %) | $10K_2O.90SiO_2$ | 2.58 | 42 |
| 31 | CdS (5 wt %) | $15MgO.85SiO_2$ | 2.61 | 39 |
| 32 | CdS (5 wt %) | $7CaO.93SiO_2$ | 2.59 | 41 |
| 33 | CdS (5 wt %) | $15BaO.85SiO_2$ | 2.65 | 37 |
| 34 | CdS (5 wt %) | $20SrO.80SiO_2$ | 2.58 | 42 |
| 35 | CdS (5 wt %) | $5Na_2O.20Al_2O_2.75SiO_2$ | 2.6 | 40 |
| 36 | CdS (5 wt %) | $5Na_2O.5B_2O_3.90SiO_2$ | 2.7 | 30 |
| 37 | CdS (5 wt %) | $5Na_2O.20ZrO_2.75SiO_2$ | 2.6 | 40 |
| 38 | CdS (5 wt %) | $6P_2O_5.2Al_2O_3.92SiO_2$ | 2.7 | 30 |
| 39 | CdS (5 wt %) | $5K_2O.10ZnO.85SiO_2$ | 2.60 | 38 |
| 40 | CdS (5 wt %) | $20MgO.20Al_2O_3.60SiO_2$ | 2.57 | 40 |
| 41 | CdS (5 wt %) | $10Na_2O.6CaO.95.2SiO_2$ | 2.63 | 38 |
| 42 | CdS (5 wt %) | $5Na_2O.15K_2O.80SiO_2$ | 2.58 | 42 |
| 43 | CdS (5 wt %) | $5Li_2O.5Al_2O_3.20TiO_2.70SiO_2$ | 2.62 | 38 |
| 44 | CdS (5 wt %) | $20MgO.20Al_3O_3.20ZrO_2.40SiO_2$ | 2.62 | 38 |
| 45 | CdS (5 wt %) | $10BaO.15TiO_2.20ZrO_2.55SiO_2$ | 2.65 | 37 |
| 46 | CdS (5 wt %) | $5La_2O_3.10Al_2O_3.20ZrO_2.65SiO_2$ | 2.55 | 44 |
| 47 | CdS (10 wt %) | $20TiO_2.80SiO_2$ | 2.42 | 73 |
| 48 | CdS (15 wt %) | $20TiO_2.80SiO_2$ | 2.50 | 51 |
| 49 | CdS (4.5 wt %) | $10TiO_2.90SiO_2$ | 2.52 | 48 |
| 50 | CdS (10 wt %) | $10Al_2O_3.15TiO_2.75SiO_2$ | 2.52 | 48 |
| 51 | CdS (3.2 wt %) | $10ZrO_2.90SiO_2$ | 2.77 | 30 |

EXAMPLE 52

CdS microcrystal-containing multicomponent glass thin film according to the producing method A Into a solution of 27.5 g of 0.15 mol/l HCl aqueous solution and 394.7 g of $C_2H_5OH$, 325.3 g of $Si(OC_2H_5)_4$ was added dropwise while stirring. After all of Si-$(OC_2H_5)_4$ was added, the mixture solution was further stirred for an hour to prepare 747.5 g of a partially hydrolyzed $Si(OC_2H_5)_4$ solution. Into the partially hydrolyzed solution, 35.8 g of $Al(OC_4H_9)_3$ was added and then the resulting mixture solution was heated at 80° C. and refluxed for 24 hours in a nitrogen atmosphere.

Then, the sol solution thus prepared was cooled to room temperature. Then, a solution prepared by dissolving 9.41 g of $Cd(CH_3COO)_2.2H_2O$ into 60 g of $CH_3OH$ was put into the sol solution and then stirred for an hour. Further, 147.3 g of $C_2H_5OH$ was added to the sol solution to prepare a coating sol solution.

The sol solution was applied onto a glass substrate by the dipping method and dried at 200° C. for 30 minutes to prepare a gel solid (gel thin film) containing Cd element.

Thereafter, the semiconductor-containing glass thin film (CdS microcrystal-containing glass thin film) having physical properties as shown in Table 3 was prepared in the same manner as in Example 1 and in the glass-forming condition and the gas treatment condition as shown in Table 3.

EXAMPLE 53

CdS microcrystal-containing multicomponent glass thin film according to the producing method A After preparing 305.1 g of partially hydrolyzed Si(OC$_2$H$_5$)$_4$ solution in the same manner as in Example 52, a gel solid (gel thin film) was prepared in the nearly same manner as in Example 52, except that Al(OC$_4$H$_9$)$_3$ used in Example 52 was replaced by 118.4 g of Zr(OCH$_3$H$_7$)$_4$, and that heating/refluxing treatment in a nitrogen atmosphere was omitted. Then, a semiconductor-containing glass thin film (CdS microcrystal-containing glass thin film) having physical properties as shown in Table 3 was prepared in the same manner as in Example 52 and in the glass-forming condition and the gas treatment condition as shown in Table 3.

EXAMPLE 54

CdS microcrystal-containing multicomponent glass thin film according to the producing method A After 410.9 g of partially hydrolyzed Si(OC$_2$H$_5$)$_4$ solution was prepared in the same method of Example 52, a gel solid (gel thin film) containing Cd element was prepared in the nearly same manner as in Example 52, except that Al(OC$_4$H$_9$)$_3$ used in Example 52 was replaced by a mixture of a solution prepared by dissolving 10.2 g of H$_3$BO$_3$ into 140 g of C$_2$H$_5$OH with 31.8 g of methanol solution of 28% CH$_3$ONa. Here, the methanol solution of 28% CH$_3$ONa was added under ice cooling to a solution prepared by: adding the aforementioned H$_3$BO$_3$ solution into the partially hydrolyzed Si(OC$_2$H$_5$)$_4$; stirring them for an hour; and cooling them with ice to a suitable temperature. After the addition of the methanol solution, the resulting mixture solution was stirred for an hour.

Thereafter, a semiconductor-containing glass thin film (CdS microcrystal-containing glass thin film) having physical properties as shown in Table 3 was prepared in the same manner as in Example 52 and in the glass-forming condition and the gas treatment condition as shown in Table 3.

partially hydrolyzed solution composed of 20 mol % TiO$_2$ and 80 mol % SiO$_2$ calculated in terms of oxides, to which was added a solution prepared by dissolving 3.202 g of Pb(CH$_3$COO)$_2$.3H$_2$O in 60 g of CH$_3$OH and the resulting solution was stirred for an hour. Into the sol solution thus prepared, 72.0 g of C$_2$H$_5$OH and 122.6 g of aqueous solution of 0.15 mol/l NH$_4$OH were added and the resulting solution was stirred for an hour to proceed hydrolysis further.

The resulting transparent sol solution was poured into a vessel made of a material such as polymethylpentene or polypropylene and was allowed to stand. Thus, the sol solution was gelated and dried to prepare a gel solid containing Pb element.

Thereafter, a semiconductor-containing glass (PbS microcrystal-containing glass) having physical properties as shown in Table 4 was prepared in the same manner as in Example 1 and in the glass-forming condition and the gas treatment condition as shown in Table 4.

EXAMPLE 56

PbS microcrystal-containing multicomponent glass according to the producing method A Into a solution of 155.6 g of Si(OCH$_3$)$_4$ and 120.7 g of CH$_3$OH, 18.41 g of aqueous solution of 4 mol/l HNO$_3$ was added and the resulting solution was stirred for an hour. Into the resulting solution, 118.4 g of Zr(OC$_3$H$_7$)$_4$ was added and the whole mixture was stirred for 30 minutes. Then, 11.9 g of H$_2$N(CH$_2$)$_3$Si(OC$_2$H$_6$)$_4$ was further added thereto and they were stirred for 30 minutes. Into the resulting solution, 229.4 g of H$_2$O was added slowly while stirring. The solution was further stirred at room temperature for an hour to prepare a sol solution.

The resulting sol solution was poured into a vessel made of a material such as polymethylpentene or polypropylene and sealed. Thereafter it was allowed to stand in a constant temperature bath at 60° C. Thus, the sol solution was gelated to form a wet gel. After gelation, an aqueous solution of 4 mol/l NH$_4$OH was poured into the vessel and then the vessel was allowed to stand at 60° C. for 12 hours. Thereafter, the liquid in the vessel was replaced with distilled water and then the vessel was allowed to stand at 60° C. for 12 hours. Further, the liquid in the vessel was replaced with an aqueous solution of 0.25 mol/l Pb(CH$_3$COO)$_2$ and then the vessel was allowed to stand at 60° C. for 24 hours. The liquid in the vessel was discharged and carefully dried to prepare a gel solid containing PbS element.

TABLE 3

| Example | Semiconductor-containing glass | | | | Energy gap value (eV) | Particle diameter (Å) |
| --- | --- | --- | --- | --- | --- | --- |
| | Semiconductor (wt %) | Glass matrix | Glass-forming condition | Gas treatment condition* | | |
| 52 | CdS (5 wt %) | 5Al$_2$O$_3$.95SiO$_2$ | 500° C. × 1 hour | Room temperature × 1 hour | 2.65 | 37 |
| 53 | CdS (5 wt %) | 20ZrO$_2$.80SiO$_2$ | 500° C. × 1 hour | Room temperature × 1 hour | 2.6 | 40 |
| 54 | CdS (5 wt %) | 5Na$_2$O.5B$_2$O$_3$.90SiO$_2$ | 500° C. × 1 hour | Room temperature × 1 hour | 2.62 | 38 |

*H$_2$S gas at 1 atmospheric pressure was used as a gas.

EXAMPLE 55

PbS microcrystal-containing multicomponent glass according to the producing method A Into a partially hydrolyzed Si(OC$_2$H$_5$)$_4$ solution, Ti(OC$_4$H$_9$)$_4$ was added and stirred to prepare 399.0 g of Thereafter, a semiconductor-containing glass (PbS microcrystal-containing glass) having physical properties as shown in Table 4 was prepared in the same manner as in Example 55 and in the glass-forming condition and the gas treatment condition as shown in Table 4.

TABLE 4

| Example | Semiconductor-containing glass | | | Gas treatment condition* | Energy gap value (eV) | Particle diameter (Å) |
| --- | --- | --- | --- | --- | --- | --- |
| | Semiconductor (wt %) | Glass matrix | Glass-forming condition | | | |
| 55 | PbS (2 wt %) | $20TiO_2.80SiO_2$ | 500° C. × 2 hours | Room temperature × 1 hour | 1.44 | 29 |
| 56 | PbS (4.7 wt %) | $20ZrO_2.80SiO_2$ | 500° C. × 2 hours | Room temperature × 1 hour | 1.86 | 33 |

*$H_2S$ gas at 1 atmospheric pressure was used as a gas.

EXAMPLES 57 AND 58

PbS microcrystal-containing multicomponent glasses according to the producing method A Raw materials used in the sol-gel method, such as metal alkoxides corresponding to $SiO_2$, $TiO_2$ and $ZrO_2$ and/or derivatives thereof were used as raw materials for glass matrices. Lead acetate was used as a raw material for compound semiconductor. Gel solids containing Pb element were prepared using the aforementioned raw materials.

Then, the gel solids thus prepared were heated in a temperature range of 400° to 1150° C. to form glasses. After glass was formed or while the glass was formed, the glass or the gel solid was exposed to $H_2S$ gas to prepare semiconductor-containing glasses (PbS microcrystal-containing multicomponent glasses) having physical properties as shown in Table 5.

EXAMPLE 59

PbS microcrystal-containing multicomponent glass according to the producing method A Raw materials used in the sol-gel method, such as metal alkoxides corresponding to $SiO_2$ and $ZrO_2$ and/or derivatives thereof were used as raw materials for a glass matrix. Those raw materials were gelated to form a wet gel. The wet gel was impregnated with a solution prepared by dissolving lead acetate therein to thereby prepare a dry gel (gel solid).

Then, the gel solid thus prepared was heated in a temperature range of 400° to 1150° C. to form a glass. After the glass was formed, the glass solid was exposed to $H_2S$ gas to prepare a semiconductor-containing glass (PbS microcrystal-containing multicomponent glass) having physical properties as shown in Table 5.

EXAMPLE 60

PbS microcrystal-containing multicomponent glass according to the conventional method Raw materials used in the sol-gel method, such as metal alkoxides corresponding to $SiO_2$ and $P_2O_5$ and/or derivatives thereof were used as raw materials for a glass matrix. Lead nitrate and thiourea were used as raw materials for compound semiconductor. A sol solution containing Pb element and S element was prepared using the aforementioned raw materials. A dry gel (gel solid) was prepared from the sol solution.

Then, the dry gel was treated in a temperature range of 400° to 1300° C. in an atmosphere of inert gas to react elements Pb and S to thereby dispersively crystallize PbS microcrystals and form a glass to thereby prepare a semiconductor-containing glass (PbS microcrystal-containing multicomponent glass) having physical properties as shown in Table 5.

TABLE 5

| Example | Semiconductor-containing glass | | Energy gap value (eV) | Particle diameter (Å) |
| --- | --- | --- | --- | --- |
| | Semiconductor (wt %) | Glass matrix | | |
| 57 | PbS (2 wt %) | $20TiO_2.80SiO_2$ | 1.8 | 29 |
| 58 | PbS (2 wt %) | $50ZrO_2.50SiO_2$ | 1.75 | 30 |
| 59 | PbS (4.7 wt %) | $20ZrO_2.80SiO_2$ | 1.63 | 32 |
| 60 | PbS (5 wt %) | $5P_2O_5.95SiO_2$ | 1.60 | 33 |

EXAMPLE 61

ZnS microcrystal-containing multicomponent glass according to the producing method A Into 410.9 g of partially hydrolyzed $Si(OC_2H_5)_4$ solution prepared in the same manner as in Example 52, a solution prepared by dissolving 10.2 g of $H_3BO_3$ in 140 g of $C_2H_5OH$ was added and the mixture was stirred for an hour. After stirring, the mixture was ice cooled to a suitable low temperature. Then, 31.8 g of methanol solution of 28% $CH_3ONa$ was added to the mixture and stirred for an hour. Further, a solution prepared by dissolving 11.492 g of $Zn(CH_3COO)_2.2H_2O$ in 60 g of $CH_3OH$ was added thereto and they were stirred for an hour. Then, a mixture solution of 76.0 g of $C_2H_5OH$ and 118.8 g of aqueous solution of 0.15 mol/l $NH_4OH$ was added thereto and the resulting solution was stirred under ice cooling for an hour to thereby prepare a sol solution.

The resulting sol solution was poured into a vessel made of a material such as polymethylpentene or polypropylene and was allowed to stand. Thus, the sol solution was gelated and dried to prepare a gel solid containing Zn element.

Thereafter, a semiconductor-containing glass (ZnS microcrystal-containing glass) having physical properties as shown in Table 6 was prepared in the same manner as in Example 1 and in the glass-forming condition and the gas treatment condition as shown in Table 6.

EXAMPLE 62

ZnS microcrystal-containing multicomponent glass according to the producing method A A sol solution was prepared in the nearly same manner as in Example 55, except that $Pb(CH_3COO)_2.3H_2O$ used in Example 55 was replaced by 4.598 g of $Zn(CH_3COO)_2.2H_2O$. Then, a gel solid containing Zn element was prepared in the same manner as in Example 55.

Thereafter, a semiconductor-containing glass (ZnS microcrystal-containing glass) having physical properties as shown in Table 6 was prepared in the same manner as in Example 61 and in the glass-forming condition and the gas treatment condition as shown in Table 6.

TABLE 6

| Example | Semiconductor-containing glass | | Glass-forming condition | Gas treatment condition* | Energy gap value (eV) | Particle diameter (Å) |
| --- | --- | --- | --- | --- | --- | --- |
| | Semiconductor (wt %) | Glass matrix | | | | |
| 61 | ZnS (5 wt %) | $5Na_2O.5B_2O_3.90SiO_2$ | 500° C. × 2 hours | Room temperature × 1 hour | 1.44 | 27 |
| 62 | ZnS (2 wt %) | $20ZrO_2.80SiO_2$ | 500° C. × 2 hours | Room temperature × 1 hour | 1.86 | 24 |

*$H_2S$ gas at 1 atmospheric pressure was used as a gas.

EXAMPLE 63

ZnS microcrystal-containing multicomponent glass according to the producing method A Raw materials used in the sol-gel method, such as metal alkoxides corresponding to $SiO_2$ and $ZrO_2$ and/or derivatives thereof were used as raw materials for a glass matrix. Zinc acetate was used as a raw material for compound semiconductor. A gel solid containing Zn element was prepared using the aforementioned raw materials.

Then, the gel solid thus prepared was heated in a temperature range of 400° to 1150° C. to form a glass. While the glass was formed, the gel solid was exposed to $H_2S$ gas to prepare a semiconductor-containing glass (ZnS microcrystal-containing multicomponent glass) having physical properties as shown in Table 7.

EXAMPLE 64

ZnS microcrystal-containing multicomponent glass according to the producing method A A sol solution was prepared using raw materials used in the sol-gel method, such as metal alcoxides corresponding to $SiO_2$ and $ZrO_2$ and/or derivatives thereof, as raw materials for a glass matrix. The sol solution was gelated to form a wet gel. The wet gel was impregnated with a solution prepared by dissolving zinc acetate therein to thereby prepare a dry gel (gel solid).

Then, the gel solid thus prepared was heated in a temperature range of 400° to 1150° C. to form a glass. After the glass was formed, the glass was exposed to $H_2S$ gas to prepare a semiconductor-containing glass (ZnS microcrystal-containing multicomponent glass) having physical properties as shown in Table 7.

EXAMPLE 65

ZnS microcrystal-containing multicomponent glass according to the conventional method Raw materials used in the sol-gel method, such as metal alkoxides corresponding to $SiO_2$ and $B_2O_3$ and/or derivatives thereof were used as raw materials for a glass matrix. Zinc acetylacetonato and $NH_4SO_4$ were used as raw materials for compound semiconductor. A sol solution containing Zn element and S element was prepared using the aforementioned raw materials. A dry gel (gel solid) was prepared from the sol solution. The dry gel was treated in a temperature range of 400° to 1300° C. in an atmosphere of inert gas to react elements Zn and S to thereby dispersively crystallize ZnS microcrystals and form a glass to thereby prepare a semiconductor-containing glass (ZnS microcrystal-containing multicomponent glass) having physical properties as shown in Table 7.

TABLE 7

| Example | Semiconductor-containing glass | | Energy gap value (eV) | Particle diameter (Å) |
| --- | --- | --- | --- | --- |
| | Semiconductor (wt %) | Glass matrix | | |
| 63 | ZnS (2 wt %) | $20ZrO_2.80SiO_2$ | 3.9 | 24 |
| 64 | ZnS (2.3 wt %) | $10ZrO_2.90SiO_2$ | 3.88 | 24 |
| 65 | ZnS (5 wt %) | $2B_2O_3.98SiO_2$ | 3.75 | 30 |

EXAMPLES 66 and 67

CdSe microcrystal-containing multicomponent glass according to the producing method A Raw materials used in the sol-gel method, such as metal alkoxides corresponding to $SiO_2$, $B_2O_3$ and $TiO_2$ and/or derivatives thereof were used as raw materials for glass matrices. Cadmium acetate was used as a raw material for compound semiconductor. Gel solids containing Cd element were prepared using the aforementioned raw materials.

Then, the gel solids thus prepared were heated in a temperature range of 400° to 1150° C. to form glasses. After the glass was formed or while the glass was formed, the glass or the gel solid was exposed to $H_2Se$ gas to prepare semiconductor-containing glasses (CdSe microcrystal-containing multicomponent glasses) having physical properties as shown in Table 8.

EXAMPLE 68

CdSe microcrystal-containing multicomponent glass according to the producing method A A sol solution was prepared using raw materials used in the sol-gel method, such as metal alkoxides corresponding to $SiO_2$ and $TiO_2$ and/or derivatives thereof, as raw materials for a glass matrix. The sol solution was gelated to form a wet gel. The wet gel was impregnated with a solution prepared by dissolving cadmium nitrate therein to thereby prepare a dry gel (gel solid).

Then, the gel solid thus prepared was heated in a temperature range of 400° to 1150° C. to form a glass. While the glass was formed, the gel solid was exposed to $H_2Se$ gas to prepare a semiconductor-containing glass (CdSe microcrystal-containing multicomponent glass) having physical properties as shown in Table 8.

EXAMPLE 69

CdSe microcrystal-containing multicomponent glass according to the conventional method Raw materials used in the sol-gel method, such as metal alkoxides corresponding to $SiO_2$ and $TiO_2$ and/or derivatives thereof were used as raw materials for a glass matrix. Cadmium acetate and $SeO_2$ were used as raw materials for compound semiconductor. A sol solution containing Cd element and Se element was prepared using the aforementioned raw materials. A dry gel (gel solid) was prepared from the sol solution.

Then, the dry gel was treated in a temperature range of 400° to 1300° C. in a reducing atmosphere to react elements Cd and Se to thereby dispersively crystallize CdSe microcrystals and form a glass to thereby prepare a semiconductor-containing glass (CdSe microcrystal-containing multicomponent glass) having physical properties as shown in Table 8.

EXAMPLE 70

CdSe microcrystal-containing multicomponent glass according to the conventional method Raw materials used in the sol-gel method, such as metal alkoxides corresponding to $SiO_2$, $TiO_2$ and $Al_2O_3$ and/or derivatives thereof were used as raw materials for a glass matrix. Cadmium acetate and $H_2SeO_4$ were used as raw materials for compound semiconductor. A sol solution containing Cd element and Se element was prepared using the aforementioned raw materials. A dry gel (gel solid) was prepared from the sol solution.

Then, the dry gel was treated in a temperature range of 400° to 1300° C. in an atmosphere of inert gas to react elements Cd and Se to thereby dispersively crystallize CdSe microcrystals and form a glass to thereby prepare a semiconductor-containing glass (CdSe microcrystal-containing multicomponent glass) having physical properties as shown in Table 8.

EXAMPLES 71 and 72

ZnSe microcrystal-containing multicomponent glasses according to the producing method A Raw materials used in the sol-gel method, such as metal alkoxides corresponding to $SiO_2$, $ZrO_2$ and $B_2O_3$ and/or derivatives thereof were used as raw materials for glass matrices. Zinc acetate was used as a raw material for compound semiconductor. Gel solids containing Zn element were prepared using the aforementioned raw materials.

Then, the gel solids thus prepared were heated in a temperature range of 400° to 1150° C. to form glasses. After the glass was formed or while glass was formed, the glass or the gel solid was exposed to $H_2Se$ gas to prepare semiconductor-containing glasses (ZnSe microcrystal-containing multicomponent glasses) having physical properties as shown in Table 8.

EXAMPLE 73

ZnSe microcrystal-containing multicomponent glass according to the conventional method Raw materials used in the sol-gel method, such as metal alkoxides corresponding to $SiO_2$ and $TiO_2$ and/or derivatives thereof were used as raw materials for a glass matrix. Zinc acetate and $SeCl_4$ were used as raw materials for compound semiconductor. A sol solution containing Zn element and Se element was prepared using the aforementioned raw materials. A dry gel (gel solid) was prepared from the sol solution.

Then, the dry gel was treated in a temperature range of 400° to 1300° C. in a reducing atmosphere to react elements Zn and Se to thereby dispersively crystallize ZnSe microcrystals and form a glass to thereby prepare a semiconductor-containing glass (ZnSe microcrystal-containing multicomponent glass) having physical properties as shown in Table 8.

EXAMPLE 74

ZnSe microcrystal-containing multicomponent glass according to the conventional method A wet gel was prepared by gelating raw materials used in the sol-gel method, such as metal alkoxides corresponding to $SiO_2$ and $TiO_2$ and/or derivatives thereof, as raw materials for a glass matrix. Then, the wet gel was impregnated with a solution prepared by dissolving $ZnSeO_4$ therein and then dried to prepare a dry gel (gel solid).

Then, the dry gel was treated in a temperature range of 400° to 1300° C. to dispersively crystallize ZnSe microcrystals and form a glass to thereby prepare a semiconductor-containing glass (ZnSe microcrystal-containing multicomponent glass) having physical properties as shown in Table 8.

EXAMPLE 75

PbSe microcrystal-containing multicomponent glass according to the producing method A Raw materials used in the sol-gel method, such as metal alkoxides corresponding to $SiO_2$, $TiO_2$ and $ZrO_2$ and/or derivatives thereof were used as raw materials for a glass matrix. Lead nitrate was as a raw material for compound semiconductor. A gel solid containing Pb element was prepared using the aforementioned raw materials.

Then, the gel solid thus prepared was heated in a temperature range of 400° to 1150° C. to form a glass. While the glass was formed, the gel solid was exposed to $H_2Se$ gas to prepare a semiconductor-containing glass (PbSe microcrystal-containing multicomponent glass) having physical properties as shown in Table 8.

TABLE 8

| | Semiconductor-containing glass | | Energy gap value (eV) | Particle diameter (Å) |
|---|---|---|---|---|
| Example | Semiconductor (wt %) | Glass matrix | | |
| 66 | CdSe (5 wt %) | $5B_2O_3.20TiO_2.75SiO_2$ | 1.98 | 28 |
| 67 | CdSe (5.2 wt %) | $10TiO_2.90SiO_2$ | 1.95 | 29 |
| 68 | CdSe (4.8 wt %) | $10TiO_2.90SiO_2$ | 1.96 | 28 |
| 69 | CdSe (2 wt %) | $20TiO_2.80SiO_2$ | 2.0 | 27 |
| 70 | CdSe (5 wt %) | $10Al_2O_3.15TiO_2.75SiO_2$ | 1.92 | 30 |
| 71 | ZnSe (5 wt %) | $30ZrO_2.70SiO_2$ | 2.90 | 23 |
| 72 | ZnSe | $2B_2O_3.98SiO_2$ | 2.88 | 24 |

TABLE 8-continued

| | Semiconductor-containing glass | | Energy gap value (eV) | Particle diameter (Å) |
|---|---|---|---|---|
| Example | Semiconductor (wt %) | Glass matrix | | |
| 73 | (5 wt %) ZnSe | $20TiO_2 \cdot 80SiO_2$ | 2.80 | 28 |
| 74 | (2 wt %) ZnSe | $15TiO_2 \cdot 85SiO_2$ | 2.9 | 23 |
| 75 | (5.7 wt %) PbSe (10 wt %) | $5TiO_2 \cdot 10ZrO_2 \cdot 85SiO_2$ | 0.90 | 37 |

EXAMPLES 76 and 77

CdTe microcrystal-containing multicomponent glass according to the producing method A Raw materials used in the sol-gel method, such as metal alkoxides corresponding to $SiO_2$, $TiO_2$ and $B_2O_3$ and/or derivatives thereof were used as raw materials for glass matrices. Cadmium acetate was used as a raw material for compound semiconductor. Gel solids containing Cd element were prepared using the aforementioned raw materials.

Then, the gel solids thus prepared were heated in a temperature range of 400° to 1150° C. to form glasses. After the glass was formed or while the glass was formed, the glass or the gel solid was exposed to $H_2Te$ gas to prepare semiconductor-containing glasses (CdTe microcrystal-containing multicomponent glasses) having physical properties as shown in Table 9.

EXAMPLE 78

CdTe microcrystal-containing multicomponent glass according to the conventional method Raw materials used in the sol-gel method, such as metal alkoxides corresponding to $SiO_2$, $Al_2O_3$ and $TiO_2$ and/or derivatives thereof were used as raw materials for a glass matrix. A solution prepared by dissolving $CdTeO_4$ therein was used as a raw material for compound semiconductor. A sol solution containing Cd element and Te element was prepared using the aforementioned raw materials. A dry gel (gel solid) was prepared from the sol solution.

Then, the dry gel was treated in a temperature range of 400° to 1300° C. in an atmosphere of inert gas to dispersively crystallize CdTe microcrystals and form a glass to thereby prepare a semiconductor-containing glass (CdTe microcrystal-containing multicomponent glass) having physical properties as shown in Table 9.

EXAMPLE 79

PbTe microcrystal-containing multicomponent glass according to the conventional method Raw materials used in the sol-gel method, such as metal alkoxides corresponding to $SiO_2$, $TiO_2$ and $ZrO_2$ and/or derivatives thereof were used as raw materials for a glass matrix. Lead nitrate and $TeCl_4$ were used as raw materials for compound semiconductor. A sol solution containing Pb element and Te element was prepared using the aforementioned raw materials. A dry gel (gel solid) was prepared from the sol solution. Then, the dry gel was treated in a temperature range of 400° to 1300° C. in an atmosphere of inert gas to react elements Pb and Te to thereby dispersively crystallize PbTe microcrystals and form a glass to thereby prepare a semiconductor-containing glass (PbTe microcrystal-containing multicomponent glass) having physical properties as shown in Table 9.

EXAMPLE 80

PbTe microcrystal-containing multicomponent glass according to the conventional method Raw materials used in the sol-gel method, such as metal alkoxides corresponding to $SiO_2$ and $P_2O_5$ and/or derivatives thereof were used as raw materials for a glass matrix. Lead nitrate and Te metal were used as raw materials for compound semiconductor. A sol solution containing Pb element and Te element was prepared using the aforementioned raw materials. A dry gel (gel solid) was prepared from the sol solution.

Then, the dry gel was treated in a temperature range of 400° to 1300° C. in an atmosphere of inert gas to react elements Pb and Te to thereby dispersively crystallize PbTe microcrystals and form a glass to thereby prepare a semiconductor-containing glass (PbTe microcrystal-containing multicomponent glass) having physical properties as shown in Table 9.

EXAMPLE 81

ZnTe microcrystal-containing multicomponent glass according to the producing method A Raw materials used in the sol-gel method, such as metal alkoxides corresponding to $SiO_2$ and $ZrO_2$ and/or derivatives thereof were used as raw materials for a glass matrix. Zinc acetate was as a raw material for compound semiconductor. A gel solid containing Zn element was prepared using the aforementioned raw materials.

Then, the gel solid thus prepared was heated in a temperature range of 400° to 1150° C. to form a glass. While the glass was formed, the gel solid was exposed to $H_2Te$ gas to prepare a semiconductor-containing glass (ZnTe microcrystal-containing multicomponent glass) having physical properties as shown in Table 9.

EXAMPLE 82

ZnTe microcrystal-containing multicomponent glass according to the conventional method Raw materials used in the sol-gel method, such as metal alkoxides corresponding to $SiO_2$ and $B_2O_3$ and/or derivatives thereof were used as raw materials for a glass matrix. Zinc nitrate and $H_6TeO_6$ were used as raw materials for compound semiconductor. A sol solution containing Zn element and Te element was prepared using the aforementioned raw materials. A dry gel (gel solid) was prepared from the sol solution.

Then, the dry gel was treated in a temperature range of 400° to 1300° C. in an atmosphere of inert gas to dispersively crystallize ZnTe microcrystals and form a glass to thereby prepare a semiconductor-containing glass (ZnTe microcrystal-containing multicomponent glass) having physical properties as shown in Table 9.

TABLE 9

| Example | Semiconductor-containing glass | | Energy gap value (eV) | Particle diameter (Å) |
|---|---|---|---|---|
| | Semiconductor (wt %) | Glass matrix | | |
| 76 | CdTe (2.35 wt %) | $10TiO_2.90SiO_2$ | 1.87 | 23 |
| 77 | CdTe (5 wt %) | $5B_2O_3.20TiO_2.75SiO_2$ | 1.98 | 21 |
| 78 | CdTe (5 wt %) | $10Al_2O_3.15TiO_2.75SiO_2$ | 1.70 | 30 |
| 79 | PbTe (10 wt %) | $5TiO_2.10ZrO_2.85SiO_2$ | 0.85 | 75 |
| 80 | PbTe (10 wt %) | $5P_2O_5.95SiO_2$ | 1.00 | 48 |
| 81 | ZnTe (5 wt %) | $30ZrO_2.70SiO_2$ | 2.50 | 25 |
| 82 | ZnTe (5 wt %) | $2B_2O_3.98SiO_2$ | 2.54 | 23 |

EXAMPLE 83

$CdS_xSe_{(1-x)}$ microcrystal-containing multicomponent glass according to the producing method A A sol solution composed of 20 mol % $TiO_2$ and 80 mol % $SiO_2$ calculated in terms of oxides was prepared in the same manner as in Example 55. Into 399.0 g of the sol solution, a solution prepared by dissolving 7.212 g of $Cd(CH_3COO)_2.2H_2O$ in 60 g of $CH_3OH$ was put and the mixture was stirred for an hour. Then, a solution prepared by diluting a solution prepared by dissolving 1.968 g of selenium (Se) in 80 g of aqueous solution of 13 mol/l $HNO_3$ with 120.0 g of $H_2O$ and 76.6 g of $C_2H_5OH$, was added to the sol solution and the mixture was stirred for an hour to prepare a sol solution.

The resulting sol solution was poured into a vessel made of a material such as polymethylpentene or polypropylene and was allowed to stand. Thus, the sol solution was gelated and dried to prepare a gel solid containing Cd element and Se element.

The gel solid was heated at 500° C. for 2 hours to form a glass and then allowed to stand at room temperature in the presence of $H_2S$ gas at 1 atmospheric pressure to thereby prepare a semiconductor-containing glass ($CdS_xSe_{(1-x)}$ microcrystal-containing glass) having physical properties as shown in Table 10.

EXAMPLE 84

$CdS_xSe_{(1-x)}$ microcrystal-containing multicomponent glass according to the producing method A Raw materials used in the sol-gel method, such as metal alkoxides corresponding to $SiO_2$ and $TiO_2$ and/or derivatives thereof were used as raw materials for a glass matrix. Cadmium acetate and Se metal were used as a part of raw materials for compound semiconductor. A sol solution containing Cd element and Se element was prepared using the aforementioned raw materials. A dry gel (gel solid) was prepared from the sol solution.

Then, the dry gel was treated in a temperature range of 400° to 1150° C. in a reducing atmosphere to react elements Cd and Se to thereby dispersively crystallize CdSe crystalline fine particles and form a porous glass. Further, the porous glass was exposed to $H_2S$ gas to generate $CdS_xSe_{(1-x)}$ crystalline fine particles to thereby prepare a semiconductor-containing glass ($Cd_xSe_{(1-x)}$ microcrystal-containing multicomponent glass) having physical properties as shown in Table 10.

EXAMPLE 85

CuCl microcrystal-containing multicomponent glass according to the conventional method Raw materials used in the sol-gel method, such as metal alkoxides corresponding to $SiO_2$ and $Al_2O_3$ and/or derivatives thereof were used as raw materials for a glass matrix. A sol solution was prepared using the aforementioned raw materials. Into the sol solution, CuCl and acetanilide were separately added. Then, the sol solution was gelated and dried to prepare a dry gel containing CuCl. The dry gel was heated at 800° C. for 10 hours to dispersively crystallize and grow CuCl microcrystals. Thus, a glass was formed from the dry gel to prepare a semiconductor-containing glass (CuCl microcrystal-containing multicomponent glass) having physical properties as shown in Table 10.

EXAMPLE 86

CuCl microcrystal-containing multicomponent glass according to the conventional method Raw materials used in the sol-gel method, such as metal alkoxides corresponding to $SiO_2$ and PbO and/or derivatives thereof were used as raw materials used for a glass matrix. A sol solution was prepared using the aforementioned raw materials. Into the sol solution, copper nitrate and HCl were added. Then, the sol solution was gelated and dried to prepare a dry gel containing Cu element and Cl element. The dry gel was heated at 800° C. for 5 hours to dispersively crystallize and grow CuCl microcrystals. Thus, a glass was formed from the dry gel to prepare a semiconductor-containing glass (CuCl microcrystal-containing multicomponent glass) having physical properties as shown in Table 10.

TABLE 10

| Example | Semiconductor-containing glass | | Energy gap value (eV) | Particle diameter (Å) |
|---|---|---|---|---|
| | Semiconductor (wt %) | Glass matrix | | |
| 83 | CdS (0.23 wt %) CdSe (4.77 wt %) | $20TiO_2.80SiO_2$ | 2.20 | 55 |
| 84 | $CdS_xSe_{(1-x)}$ (5 wt %) | $20TiO_2.80SiO_2$ | 2.2 | 55 |
| 85 | CuCl (0.5 wt %) | $5Al_2O_3.95SiO_2$ | 3.8 | 65 |
| 86 | CuCl (2 wt %) | $5PbO.95SiO_2$ | 3.75 | 70 |

EXAMPLES 87 TO 89

PbS microcrystal-containing silica glasses according to the producing method A

Into a solution of 30.0 g of aqueous solution of 0.15 mol/l HCl and 76.6 g of $C_2H_5OH$, 354.3 g of $Si(OC_2H_5)_4$ was added dropwise while stirring. After all of $Si(OC_2H_5)_4$ was added, the resulting solution was further stirred for an hour to prepare a sol solution. Separately, 1.60 g of lead acetate trihydrous salt $[Pb(CH_3COO)_2.3H_2O]$ was dissolved in 60 g of $CH_3OH$ to prepare a solution. The solution was put into the aforementioned sol solution and the mixture was stirred for an hour. Then, 76.6 g of $C_2H_5OH$ and 120.0 g of 0.15 mol/l $NH_4OH$ were added to the resulting sol solution and the mixture was stirred for an hour to proceed hydrolysis.

The resulting sol solution was poured into a vessel made of a material such as polymethylpentene or polypropylene and was allowed to stand. Thus, the sol solution was gelated and dried to prepare three gel solid samples containing Pb element.

Thereafter, the gel solid samples were treated in the glass-forming condition and the gas treatment condition as shown in Table 11 to thereby prepare various semiconductor-containing glasses (PbS microcrystal-containing silica glasses) having physical properties as shown in Table 11.

EXAMPLES 90 TO 95

PbS microcrystal-containing silica glasses according to the producing method A

Six gel solid samples containing Pb element were prepared in the same manner as in Examples 87 to 89, except that the $Pb(CH_3COO)_2.3H_2O$ content in the sol solution was changed variously.

Thereafter, the gel solid samples were treated in the glass-forming condition and the gas treatment condition as shown in Table 11 to thereby prepare various semiconductor-containing glasses (PbS microcrystal-containing silica glasses) having physical properties as shown in Table 11.

EXAMPLE 96

PbS microcrystal-containing silica glass according to the producing method A

A mixture of 240.6 g of $Si(OCH_3)_4$ and 18.4 g of 3-aminopropyltriethoxysilane $[H_2N(CH_2)_3Si(OC_2H_5)_3]$ was diluted with 186.6 g of $CH_3OH$. Into the resulting mixture solution, 304.2 g of aqueous solution of 0.25 mol/l nitric acid ($HNO_3$) was added slowly and the mixture was stirred at room temperature for an hour.

The resulting sol solution was poured into a vessel made of a material such as polymethylpentene or polypropylene and sealed. Thereafter it was allowed to stand in an constant temperature bath at 60° C. for the gelation of the sol solution.

After the gelation, an aqueous solution of 0.25 mol/l $Pb(CH_3COO)_2$ was poured into the vessel and the mixture was allowed to stand in the constant temperature bath at 60° C. for 24 hours. Then, the liquid in the vessel was discharged and the wet gel was dried carefully to prepare a gel solid containing Pb element.

Thereafter, the gel solid was treated in the glass-forming condition and the gas treatment condition as shown in Table 11 to thereby prepare a semiconductor-containing glass (PbS microcrystal-containing silica glass) having physical properties as shown in Table 11.

TABLE 11

| Example | Semiconductor (wt %) | Glass matrix | Glass-forming conditon | Gas treatment condition* | Energy gap value (eV) | Particle diameter (Å) |
| --- | --- | --- | --- | --- | --- | --- |
| 87 | PbS (1 wt %) | $SiO_2$ | 500° C. × 2 hours | Room temperature × 1 hour | 1.98 | 27 |
| 88 | PbS (1 wt %) | $SiO_2$ | 700° C. × 2 hours | Room temperature × 1 hour | 2.56 | 21 |
| 89 | PbS (1 wt %) | $SiO_2$ | 700° C. × 2 hours | 250° C. × 1 hour | 2.65 | 32 |
| 90 | PbS (2 wt %) | $SiO_2$ | 500° C. × 2 hours | Room temperature × 1 hour | 1.77 | 30 |
| 91 | PbS (2 wt %) | $SiO_2$ | 700° C. × 2 hours | Room temperature × 1 hour | 2.38 | 23 |
| 92 | PbS (2 wt %) | $SiO_2$ | 700° C. × 2 hours | 250° C. × 1 hour | 1.64 | 32 |
| 93 | PbS (5 wt %) | $SiO_2$ | 500° C. × 2 hours | Room temperature × 1 hour | 1.62 | 32 |
| 94 | PbS (5 wt %) | $SiO_2$ | 700° C. × 2 hours | Room temperature × 1 hour | 2.27 | 24 |
| 95 | PbS (5 wt %) | $SiO_2$ | 700° C. × 2 hours | 250° C. × 1 hour | 1.61 | 33 |
| 96 | PbS (7.3 wt %) | $SiO_2$ | 500° C. × 2 hours | Room temperature × 1 hour | 1.60 | 33 |

*$H_2S$ gas at 1 atmospheric pressure was used as a gas.

EXAMPLES 97 to 99

PbS microcrystal-containing silica glass thin films according to the producing method A Into a solution of 30.0 g of aqueous solution of 0.15 mol/l HCl and 76.6 g of $C_2H_5OH$, 354.3 g of $Si(OC_2H_5)_4$ was added dropwise while stirring. After all of $Si(OC_2H_5)_4$ was added, the resulting solution was further stirred for an hour to prepare a partially hydrolyzated $Si(OC_2H_5)_4$ solution. Separately, 1.60 g of $Pb(CH_3COO)_2.3H_2O$ was dissolved in 60 g of $CH_3OH$ to prepare a solution. The solution was put into the aforementioned partially hydrolyzated solution and stirred for an hour. Then, the resulting solution was diluted with 477.5 g of $C_2H_5OH$ to prepare a coating sol solution.

The sol solution was applied to glass substrates and then dried at 200° C. for 30 minutes to prepare three gel solid samples (gel thin films) containing Pb element.

Thereafter, the gel solid samples were treated in the glass-forming condition and the gas treatment condition as shown in Table 12 to thereby prepare semiconductor-containing glasses (PbS microcrystal-containing silica glass thin films) having physical properties as shown in Table 12. The thickness of each of the glass thin films was 0.23 μm.

EXAMPLES 100 to 105

PbS microcrystal-containing silica glass thin films according to the producing method A Six gel solid samples (gel thin films) containing Pb element were prepared in the same manner as in Examples 97 to 99, except that the $Pb(CH_3COO)_2.3H_2O$ content in the sol solution was changed variously.

Thereafter, the gel solid samples were treated in the glass-forming condition and the gas treatment condition as shown in Table 12 to thereby prepare various semiconductor-containing glasses (PbS microcrystal-containing silica glass thin films) having physical properties as shown in Table 12.

90.0 g of $H_2O$ and 76.6 g of $C_2H_5OH$. Into the resulting mixture, 7.56 g of o-phenylenediamine $[C_6H_4(NH_2)_2]$ was added to prepare a piaselenole solution. The piaselenole solution was added to the aforementioned partially hydrolyzed solution and stirred for an hour.

The resulting sol solution was poured into a vessel made of a material such as polymethylpentene or polypropylene and was allowed to stand. Thus, the sol solution was gelated and dried to prepare a dry gel (gel solid) containing two elements Pb and Se.

The dry gel was put into an electric tubular furnace and heated in the air at 400° C. for 5 hours to remove an organic residue by oxidization. Then, the atmospheric gas was changed to a mixture gas consisting of 3% of $H_2$ and 97% of $N_2$. While the $H_2/N_2$ mixture gas was poured at the rate of 50 ml per minute, the dry gel was heated at 500° C. for 2 hours as shown in Table 13 to thereby crystallize PbSe microcrystals and form a glass from the dry gel. Thus, a semiconductor-containing glass (PbSe microcrystal-containing silica glass) having physical properties as shown in Table 13 was obtained.

EXAMPLE 108

PbTe microcrystal-containing silica glass according to

TABLE 12

| Example | Semiconductor-containing glass Semiconductor (wt %) | Glass matrix | Glass-forming conditon | Gas treatment condition* | Energy gap value (eV) | Particle diameter (Å) |
|---|---|---|---|---|---|---|
| 97 | PbS (1 wt %) | SiO$_2$ | 500° C. × 1 hour | Room temperature × 1 hour | 1.44 | 38 |
| 98 | PbS (1 wt %) | SiO$_2$ | 700° C. × 1 hour | Room temperature × 1 hour | 1.86 | 28 |
| 99 | PbS (1 wt %) | SiO$_2$ | 700° C. × 1 hour | 250° C. × 1 hour | 1.20 | 52 |
| 100 | PbS (2 wt %) | SiO$_2$ | 500° C. × 1 hour | Room temperature × 1 hour | 1.29 | 45 |
| 101 | PbS (2 wt %) | SiO$_2$ | 700° C. × 1 hour | Room temperature × 1 hour | 1.73 | 30 |
| 102 | PbS (2 wt %) | SiO$_2$ | 700° C. × 1 hour | 250° C. × 1 hour | 1.19 | 53 |
| 103 | PbS (5 wt %) | SiO$_2$ | 500° C. × 1 hour | Room temperature × 1 hour | 1.18 | 54 |
| 104 | PbS (5 wt %) | SiO$_2$ | 700° C. × 1 hour | Room temperature × 1 hour | 1.65 | 32 |
| 105 | PbS (5 wt %) | SiO$_2$ | 700° C. × 1 hour | 250° C. × 1 hour | 1.17 | 55 |

*$H_2S$ gas at 1 atmospheric pressure was used as a gas.

EXAMPLE 106

ZnSe microcrystal-containing silica glass according to the producing method A

A gel solid containing Zn element was prepared in the same manner as in Examples 106 to 108. The gel solid was treated in the heat treatment condition as shown in Table 13 to thereby prepare a semiconductor-containing glass (ZnSe microcrystal-containing silica glass) having physical properties as shown in Table 13.

EXAMPLE 107

PbSe microcrystal-containing silica glass according to the conventional method

A partially hydrolyzed $Si(OC_2H_5)_4$ solution in the amount of 460.8 g was prepared in the same manner as in Examples 97 to 99. Into the partially hydrolyzed solution, a solution prepared by dissolving 2.786 g of $Pb(CH_3COO)_2.3H_2O$ into 60 g of $CH_3OH$ was added and the mixture was stirred for an hour. Separately, a solution prepared by dissolving 0.552 g of Se in 75.0 g of aqueous solution of 13 mol/l $HNO_3$ was diluted with the conventional method A semiconductor-containing glass (PbTe microcrystal-containing silica glass) having physical properties as shown in Table 13 was prepared in the same manner as in Example 107, except that Se was replaced by tellurium (Te) and that $C_6H_4(NH_2)_2$ was not used in this example.

EXAMPLE 109

ZnTe microcrystal-containing silica glass according to the conventional method

A semiconductor-containing glass (ZnTe microcrystal-containing silica glass) having physical properties as shown in Table 13 was prepared in the same manner as in Example 108, except that $Pb(CH_3COO)_2.3H_2O$ was replaced by $Zn(CH_3COO)_2.2H_2O$.

EXAMPLE 110

ZnTe microcrystal-containing silica glass according to the conventional method

A partially hydrolyzed $Si(OC_2H_5)_4$ solution in the amount of 460.8 g was prepared in the same manner as in Example 107. Into the partially hydrolyzed solution, a solution prepared by dissolving 2.332 g of $Zn(CH_3COO)_2.2H_2O$ in 60 g of $CH_3OH$ was added and the resulting mixture was stirred for an hour.

Separately, a solution prepared by dissolving 2.792 g of tellurium tetrachloride ($TeCl_4$) in 100 g of $C_2H_5OH$ was diluted with 171.2 g of aqueous solution of 3.5 mol/l $HNO_3$ and 76.6 g of $C_2H_5OH$ to prepare a mixture solution. The mixture solution was added to the partially hydrolyzed solution (which had been stirred) and stirred for an hour.

The resulting sol solution was gelated and dried in the same manner as in Example 109, to prepare a dry gel. The dry gel was subjected to heat treatment in the same manner as in Example 109 to thereby prepare a semiconductor-containing glass (ZnTe microcrystal-containing silica glass) having physical properties as shown in Table 13.

EXAMPLE 111

CuBr microcrystal-containing silica glass according to the conventional method

A partially hydrolyzed $Si(OC_2H_5)_4$ solution in the amount of 460.8 g was prepared in the same manner as in Example 107. Into the partially hydrolyzed solution, 2.02 g of copper(I) bromide (CuBr) was added with 150.0 g of acetonitrile ($CH_3CN$) and stirred for 2 hours.

The resulting sol solution was gelated and dried in the same manner as in Example 107, to prepare a dry gel containing CuBr.

The dry gel was heated in the air at 900° C. for 5 hours as shown in Table 13 to thereby crystallize CuBr microcrystals and form a glass from the dry gel to thereby prepare a semiconductor-containing glass (CuBr microcrystal-containing silica glass) having physical properties as shown in Table 13.

EXAMPLE 112

CuI microcrystal-containing silica glass according to the conventional method

A semiconductor-containing glass (CuI microcrystal-containing silica glass) having physical properties as shown in Table 13 was prepared in the same manner as in Example 111, except that CuBr was replaced by copper(I) iodide (CuI).

TABLE 13

| | Semiconductor-containing glass | | | Energy gap value (eV) | Particle diameter (Å) |
|---|---|---|---|---|---|
| Example | Semiconductor (wt %) | Glass matrix | Heat treatment condition | | |
| 106 | ZnSe (5 wt %) | $SiO_2$ | 500° C. × 2 hours (glass forming) Room temperature × 1 hour (gas treatment*1) | 2.90 | 23 |
| 107 | PbSe (2 wt %) | $SiO_2$ | 400° C. × 5 hours (glass forming*2) 500° C. × 2 hours (precipitation *3) | 0.99 | 42 |
| 108 | PbTe (5 wt %) | $SiO_2$ | 400° C. × 5 hours (glass forming*2) 500° C. × 2 hours (precipitation*3) | 1.23 | 27 |
| 109 | ZnTe (5 wt %) | $SiO_2$ | 400° C. × 5 hours (glass forming*2) 500° C. × 2 hours (precipitation*3) | 2.55 | 23 |
| 110 | ZnTe (2 wt %) | $SiO_2$ | 400° C. × 5 hours (glass forming*2) 500° C. × 2 hours (precipitation*3) | 2.87 | 20 |
| 111 | CuBr (2 wt %) | $SiO_2$ | 900° C. × 5 hours (glass forming*4) | 3.03 | 80 |
| 112 | CuI (2 wt %) | $SiO_2$ | 900° C. × 5 hours (glass forming*4) | 3.10 | 55 |

*1Treatment for dispersively crystallizing semiconductor microcrystals. $H_2Se$ gas at 1 atmospheric pressure was used as a gas.
*2This treatment was made in the air.
*3Treatment for dispersively crystallizing semiconductor microcrystals. This treatment was made in the presence of $H_2/N_2$ mixture gas.
*4This treatment served as treatment for dispersively crystallizing semiconductor microcrystals. This treatment was made in the air.

EXAMPLES 113 to 115

Production of ZnS microcrystal-containing silica glasses according to the producing method A A sol solution was prepared in the same manner as in Examples 87 to 89, except that 1.60 g of lead acetate trihydrous salt [$Pb(CH_3COO)_2.3H_2O$] was replaced by 4.598 g of zinc acetate dihydrous salt [$Zn(CH_3COO)_2.2H_2O$]. The sol solution was gelated and dried in the same manner as in Examples 87 to 89, to prepare three gel solid samples containing Zn element.

The gel solid samples were respectively treated in the glass-forming condition and the gas treatment condition as shown in Table 14, to produce various semiconductor-containing glasses (ZnS microcrystal-containing silica glasses) having physical properties as shown in Table 14.

EXAMPLES 116 to 127

Production of ZnS microcrystal-containing silica glasses according to the producing method A Twelve gel solid samples containing Zn element were prepared in the same manner as in Examples 113 to 115, except that the $Zn(CH_3COO)_2.2H_2O$ content in the sol solution was changed variously.

The gel solid samples were respectively treated in the glass-forming condition and the gas treatment condition as shown in Table 14, to produce various semiconductor-containing glasses (ZnS microcrystal-containing silica glasses) having physical properties as shown in Table 14.

EXAMPLE 128

Production of a ZnS microcrystal-containing silica glass according to the producing method A A partially hydrolyzed $Si(OC_2H_5)_4$ solution was prepared in the same manner as in Examples 87 to 89. Into 460.8 g of the partially hydrolyzed solution, 5.424 g of zinc acetylacetonato [$Zn(CH_2COCH_2COCH_3)_2$] and 100 g of acetylacetone ($CH_3COCH_2COCH_3$) were added and then refluxed while heating in a nitrogen atmosphere for 5 hours. Then, the mixture solution was cooled to room temperature. Into the mixture solution, 76.6 g of $C_2H_5OH$ and 120.0 g of aqueous solution of 0.15 mol/l $NH_4OH$ were added and stirred for an hour to accelerate hydrolysis.

The resulting sol solution was gelated and dried in the same manner as in Examples 113 to 115, to prepare a gel solid containing Zn element.

Thereafter, the gel solid was treated in the glass-forming condition and the gas treatment condition as shown in Table 14 to thereby produce a semiconductor-containing glass (ZnS microcrystal-containing silica glass) having physical properties as shown in Table 14.

EXAMPLES 130 to 132

Production of ZnS microcrystal-containing silica glass thin films according to the producing method A Three gel solid samples (gel thin films) containing Zn element prepared in the same manner as in Example 129, except that the $Zn(CH_3COO)_2 \cdot 2H_2O$ content in the sol solution was changed variously.

Thereafter, the gel solid samples were treated in the glass-forming condition and the gas treatment condition as shown in Table 15 to thereby produce various semiconductor-containing glasses (ZnS microcrystal-containing silica glasses) having physical properties as shown in Table 15.

EXAMPLE 133

Production of a CuS microcrystal-containing silica glass according to the producing method A

TABLE 14

| | Semiconductor-containing glass | | | | Energy gap value (eV) | Particle diameter (Å) |
|---------|---------------------|--------------|-------------------------|-------------------------|-------|-----|
| Example | Semiconductor (wt %) | Glass matrix | Glass-forming condition | Glass treatment condition* | | |
| 113 | ZnS (2 wt %) | $SiO_2$ | 500° C. × 2 hours | Room temperature × 1 hour | 3.85 | 25 |
| 114 | ZnS (2 wt %) | $SiO_2$ | 700° C. × 2 hours | Room temperature × 1 hour | 4.01 | 21 |
| 115 | ZnS (2 wt %) | $SiO_2$ | 700° C. × 2 hours | 250° C. × 1 hour | 3.85 | 25 |
| 116 | ZnS (0.5 wt %) | $SiO_2$ | 500° C. × 2 hours | Room temperature × 1 hour | 3.92 | 23 |
| 117 | ZnS (0.5 wt %) | $SiO_2$ | 700° C. × 2 hours | Room temperature × 1 hour | 4.08 | 20 |
| 118 | ZnS (0.5 wt %) | $SiO_2$ | 700° C. × 2 hours | 250° C. × 1 hour | 3.91 | 24 |
| 119 | ZnS (1 wt %) | $SiO_2$ | 500° C. × 2 hours | Room temperature × 1 hour | 3.89 | 24 |
| 120 | ZnS (1 wt %) | $SiO_2$ | 700° C. × 2 hours | Room temperature × 1 hour | 4.05 | 20 |
| 121 | ZnS (1 wt %) | $SiO_2$ | 700° C. × 2 hours | 250° C. × 1 hour | 3.90 | 24 |
| 122 | ZnS (5 wt %) | $SiO_2$ | 500° C. × 2 hours | Room temperature × 1 hour | 3.83 | 26 |
| 123 | ZnS (5 wt %) | $SiO_2$ | 700° C. × 2 hours | Room temperature × 1 hour | 3.99 | 22 |
| 124 | ZnS (5 wt %) | $SiO_2$ | 700° C. × 2 hours | 250° C. × 1 hour | 3.83 | 26 |
| 125 | ZnS (10 wt %) | $SiO_2$ | 500° C. × 2 hours | Room temperature × 1 hour | 3.81 | 27 |
| 126 | ZnS (10 wt %) | $SiO_2$ | 700° C. × 2 hours | Room temperature × 1 hour | 3.97 | 22 |
| 127 | ZnS (10 wt %) | $SiO_2$ | 700° C. × 2 hours | 250° C. × 1 hour | 3.82 | 27 |
| 128 | ZnS (2 wt %) | $SiO_2$ | 500° C. × 2 hours | Room temperature × 1 hour | 3.86 | 25 |

*$H_2S$ gas at 1 atmospheric pressure was used as a gas.

EXAMPLE 129

Production of a ZnS microcrystal-containing silica glass thin film according to the producing method A A coating sol solution was prepared in the same manner as in Examples 97 to 99, except that 1.60 g of $Pb(CH_3COO)_2 \cdot 3H_2O$ was replaced by 1.15 g of $Zn(CH_3COO)_2 \cdot 2H_2O$. The coating sol solution was gelated and dried in the same manner as in Examples 97 to 99, to prepare three gel solid samples (gel thin films) containing Zn element.

Thereafter, the gel solid sample was treated in the glass-forming condition and the gas treatment condition as shown in Table 15 to thereby produce a semiconductor-containing glass (ZnS microcrystal-containing silica glass thin film) having physical properties as shown in Table 15.

A sol solution was prepared by adding 354.3 g of $Si(OC_2H_5)_4$ dropwise into a mixture solution of 3.00 g of aqueous solution of 0.15 mol/l HCl and 76.7 g of $C_2H_5OH$ while stirring. After all of $Si(OC_2H_5)_4$ was added, the resulting sol solution was further stirred for an hour. Separately, a solution was prepared by dissolving 12.7 g of copper nitrate trihydrous salt [$Cu(NO_3) \cdot 3H_2O$] in 60.0 g of $CH_3OH$. The solution was put into the aforementioned sol solution and stirred for an hour. Then, 76.7 g of $C_2H_5OH$ and 120.0 g of 0.15 mol/l $NH_4OH$ were added thereto and stirred for an hour to accelerate hydrolysis.

The resulting sol solution was poured into a vessel made of a material such as polymethylpentene or polypropylene and was made to stand. Thus, the sol solution was gelated and dried to prepare a gel solid containing Cu element.

Thereafter, the gel solid was heated at 500° C. for 2 hours to form a glass and then allowed to stand in the presence of $H_2S$ gas at 1 atmospheric pressure at room temperature for an hour to thereby produce a semiconductor-containing glass (CuS microcrystal-containing silica glass) having physical properties as shown in Table 15.

TABLE 15

| Example | Semiconductor-containing glass | | | | Energy gap value (eV) | Particle diameter (Å) |
|---|---|---|---|---|---|---|
| | Semiconductor (wt %) | Glass matrix | Glass-forming condition | Glass treatment condition* | | |
| 129 | ZnS (0.5 wt %) | $SiO_2$ | 500° C. × 1 hour | Room temperature × 1 hour | 4.04 | 21 |
| 130 | ZnS (1 wt %) | $SiO_2$ | 500° C. × 1 hour | Room temperature × 1 hour | 4.01 | 21 |
| 131 | ZnS (2 wt %) | $SiO_2$ | 500° C. × 1 hour | Room temperature × 1 hour | 3.98 | 22 |
| 132 | ZnS (5 wt %) | $SiO_2$ | 500° C. × 1 hour | Room temperature × 1 hour | 3.96 | 22 |
| 133 | CuS (5 wt %) | $SiO_2$ | 500° C. × 2 hours | Room temperature × 1 hour | 1.50 | 40 |

*$H_2S$ gas at 1 atmospheric pressure was used as a gas.

In each of the various semiconductor-containing glasses prepared in the Examples 1 through 133 as described above, no crystal but compound semiconductor was found in the glass matrix.

As is obvious from Tables 1 through 15, each of the various semiconductor-containing glasses (a semiconductor-containing glass I and a semiconductor-containing glass II) according to the present invention and the various semiconductor-containing glasses according to the producing method A has an energy gap value higher than that of a compound semiconductor single crystal. To give large non-linear characteristic to a semiconductor-containing glass, the revelation of a quantum size effect has a great influence. And the quantum size effect gives a large energy gap value to semiconductor-containing multicomponent glass.

Accordingly, it is to be understood that a remarkable quantum size effect is revealed in the various semiconductor-containing glasses of the present invention and the various semiconductor-containing glasses according to the producing method A of the present invention. Consequently, the semiconductor-containing glass useful as a non-linear optical material can be provided by enforcing the present invention.

What is claimed is:

1. A semiconductor-containing glass, which comprises:

a multicomponent glass as a glass matrix, said multicomponent glass being produced by a sol-gel method and containing $SiO_2$ as a main component and at least one member selected from the group consisting of $ZrO_2$, $TiO_2$, $Al_2O_3$, $Na_2O$, $K_2O$, $Li_2O$, MgO, ZnO, CaO, PbO, BaO, $B_2O_3$, $P_2O_5$, SrO and $La_2O_3$ as a subsidiary component; and at least one compound semiconductor selected from the group consisting of CdS, PbS, ZnS, CdSe, ZnSe, PbSe, CdTe, PbTe, ZnTe and CuCl, said compound semiconductor being dispersively crystallized in said glass matrix in an amount of not smaller than 0.1% by weight.

2. A semiconductor-containing glass according to claim 1, wherein the energy gap value of said a semiconductor-containing glass calculated from an absorption end of light absorption spectra is larger than that of a single crystal of the compound semiconductor dispersively crystallized in said semiconductor-containing glass.

3. A semiconductor-containing glass according to claim 1, wherein the dispersively crystallized compound semiconductor has a particle diameter of not larger than 1000 Å.

4. A semiconductor-containing glass, which comprises:

a silica glass as a glass matrix produced by a sol-gel method; and at least one compound semiconductor selected from the group consisting of PbS, ZnSe, PbSe, PbTe, ZnTe, CuBr and CuI, said compound semiconductor being dispersively crystallized in said glass matrix in an amount of not smaller than 0.1% by weight.

5. A semiconductor-containing glass according to claim 4, wherein the energy gap value of said semiconductor-containing glass calculated from an absorption end of light absorption spectra is larger than that of a single crystal of the compound semiconductor dispersively crystallized in said semiconductor-containing glass.

6. A semiconductor-containing glass according to claim 4, wherein the compound semiconductor dispersively crystallized has a particle diameter of not larger than 1000 Å.

7. A method of producing a semiconductor-containing glass comprising:

a first step of preparing a gel solid which contains at least one metal element as a raw material for a compound semiconductor and which will later form a glass by heat treatment; and a second step of exposing said gel solid to a gas after heating said gel solid to a temperature of from 400° to 1150° C. to form a glass or while heating said gel solid to a temperature of from 400° to 1150° C. to form a glass, said gas containing at least one non-metal element which reacts with said metal element to thereby produce a compound semiconductor.

8. A method of producing a semiconductor-containing glass according to claim 7, wherein said metal element as a raw material for a compound semiconductor is selected from the group consisting of Cd, Zn, Pb, Cu, Hg, Ag, Ni, Pd, Mn, Co, Ga, Bi, As, In and Al; and said gas containing at least one non-metal element is selected from the group consisting of $H_2S$ gas, HCl gas, $H_2Se$ gas, $H_2Te$ gas, $AsH_3$ gas and $SbH_3$ gas.

9. A method of producing a semiconductor-containing glass according to claim 7, wherein said first step includes the steps of:

preparing a sol solution for a glass matrix, said sol solution containing a metal element as a raw material for a compound semiconductor; and gelating and drying said sol solution to thereby prepare said gel solid.

10. A method of producing a semiconductor-containing glass according to claim 7, wherein said first step includes the steps of:

preparing a wet gel from a sol solution for a glass matrix;

impregnating said wet gel with a solution containing at least one metal element as a raw material for a compound semiconductor; and drying said wet gel impregnated with said solution to thereby prepare said gel solid.

11. A method of producing a semiconductor-containing glass according to claim 7, wherein said first step includes the steps of:

preparing a gel solid from a sol solution for a glass matrix; and impregnating said gel solid with a solution containing at least one metal element as a raw material for a compound semiconductor.

12. A method of producing a semiconductor-containing glass according to claim 7, wherein the microcrystal size of said compound semiconductor dispersively crystallized is controlled by at least one of the conditions for forming a glass from said gel solid and the condition for exposing said gel solid to said gas containing at least one non-metal element, in said second step.

* * * * *